(12) United States Patent
Jasmin et al.

(10) Patent No.: US 11,929,704 B1
(45) Date of Patent: Mar. 12, 2024

(54) METHOD AND SYSTEM FOR SECURING A SOLAR PANEL TO A TILE ROOF

(71) Applicant: Sunmodo Corporation, Vancouver, WA (US)

(72) Inventors: Roland Jasmin, Vancouver, WA (US); Steve Mumma, Oregon City, OR (US); Sergio Lira, Chesapeake, VA (US)

(73) Assignee: Sunmodo Corporation, Vancouver, WA (US)

( * ) Notice: Subject to any disclaimer, the term of this patent is extended or adjusted under 35 U.S.C. 154(b) by 0 days.

(21) Appl. No.: 18/373,274

(22) Filed: Sep. 27, 2023

(51) Int. Cl.
| | |
|---|---|
| *H02S 20/23* | (2014.01) |
| *E04B 1/38* | (2006.01) |
| *E04B 1/68* | (2006.01) |
| *F24S 25/00* | (2018.01) |
| *F24S 25/10* | (2018.01) |

(Continued)

(52) U.S. Cl.
CPC .............. *H02S 20/23* (2014.12); *E04B 1/388* (2023.08); *E04B 1/6801* (2013.01); *F24S 25/00* (2018.05); *F24S 25/10* (2018.05); *F24S 25/61* (2018.05); *H02S 20/24* (2014.12); *E04B 2001/389* (2023.08); *F24S 2025/021* (2018.05);

(Continued)

(58) Field of Classification Search
CPC .......... H02S 20/23; H02S 20/24; F24S 25/00; F24S 25/10; F24S 25/61; F24S 2025/021; F24S 2025/6005; F24S 2025/6006
See application file for complete search history.

(56) References Cited

U.S. PATENT DOCUMENTS

| | | | |
|---|---|---|---|
| 3,815,301 A | | 6/1974 | Beard et al. |
| 4,795,294 A | * | 1/1989 | Takada ..................... A47G 1/22 |
| | | | 248/547 |

(Continued)

FOREIGN PATENT DOCUMENTS

| | | |
|---|---|---|
| CN | 104912260 A | 9/2015 |
| CN | 205777170 U | 12/2016 |

(Continued)

OTHER PUBLICATIONS

Notice of Acceptance (NOA), 23-0110.05, Feb. 23, 2023, Miami-Dade Country, Miami, FL, downloaded from the Internet from: https://www.miamidade.gov/building/library/productcontrol/noa/23011005.pdf on Jul. 27, 2023.

(Continued)

*Primary Examiner* — Jessie T Fonseca
(74) *Attorney, Agent, or Firm* — Stone Creek Services LLC; Alan M Flum

(57) ABSTRACT

Disclosed are methods and devices for securing a solar panel racking system to a tile roof, without removing roof tiles. The devices and method in combination may operate under severe weather conditions such as hurricanes, typhoons, and other tropical cyclones. An installer positions a stanchion through a hole in one of the roof tiles in the tile roof and onto a layer of polyurethane foam positioned over a layer of waterproof roof adhesive sealant. The installer extends the threaded fasteners obliquely through the stanchion, the layer of polyurethane foam, and the layer of waterproof roof adhesive sealant into the roof deck. The waterproof adhesive sealant bonds to the roof underlayment and creates a waterproof seal between the threaded fasteners and the roof deck.

15 Claims, 21 Drawing Sheets

(51) Int. Cl.
 F24S 25/61 (2018.01)
 H02S 20/24 (2014.01)
 F24S 25/60 (2018.01)
(52) U.S. Cl.
 CPC .................. F24S 2025/6005 (2018.05); F24S 2025/6006 (2018.05)

(56) References Cited

U.S. PATENT DOCUMENTS

| | | | | |
|---|---|---|---|---|
| 5,010,700 | A | * | 4/1991 | Blair .................. E04D 13/1476 52/48 |
| 5,346,169 | A | * | 9/1994 | Polonsky .................. A47G 1/20 248/225.11 |
| 7,797,883 | B2 | | 9/2010 | Tarbell et al. |
| 7,861,485 | B1 | | 1/2011 | Wentworth et al. |
| 8,448,407 | B1 | * | 5/2013 | Wiener .................. F16B 43/001 52/173.3 |
| 8,776,456 | B1 | * | 7/2014 | Schrock .................. H02S 20/00 52/173.3 |
| 8,806,815 | B1 | * | 8/2014 | Liu ........................ F24S 25/615 52/173.3 |
| 8,950,157 | B1 | * | 2/2015 | Schrock .................. H02S 20/00 403/258 |
| 10,284,136 | B1 | | 5/2019 | Mayfield et al. |
| 10,601,362 | B2 | * | 3/2020 | Stephan .................. H02S 40/00 |
| 11,114,974 | B2 | * | 9/2021 | McPheeters ............ H02S 20/23 |
| 11,750,143 | B1 | * | 9/2023 | Jasmin ..................... H02S 30/10 248/237 |
| 2007/0051463 | A1 | * | 3/2007 | Waggoner ................ E06B 1/62 156/292 |
| 2010/0170163 | A1 | * | 7/2010 | Tarbell .................... F24S 25/61 52/27 |
| 2013/0091787 | A1 | | 4/2013 | Puga |
| 2013/0181097 | A1 | * | 7/2013 | Snidow ................... H02S 20/23 248/121 |
| 2014/0331593 | A1 | * | 11/2014 | Okada ..................... E04B 1/388 52/705 |
| 2015/0155823 | A1 | * | 6/2015 | West ...................... F24S 25/613 248/346.04 |
| 2016/0087576 | A1 | * | 3/2016 | Johansen ................. E04D 1/36 52/58 |
| 2016/0105143 | A1 | * | 4/2016 | Johansen ................ F24S 25/61 248/237 |
| 2021/0042911 | A1 | * | 2/2021 | You ........................ G06T 7/0004 |

FOREIGN PATENT DOCUMENTS

| | | | | |
|---|---|---|---|---|
| CN | 206554289 | U | | 10/2017 |
| CN | 207419881 | U | | 5/2018 |
| CN | 208251473 | U | | 12/2018 |
| DE | 102009022161 | A1 | * | 12/2010 ............ F24J 2/5245 |
| EP | 2662646 | A1 | * | 11/2013 ............... E04B 1/40 |
| FR | 2997740 | A1 | * | 5/2014 ............... F16B 7/187 |
| JP | 08284351 | A | * | 10/1996 ............... F24S 25/33 |
| JP | 2010047687 | A | | 3/2010 |
| WO | 1996006245 | A1 | | 2/1996 |
| WO | WO-2012127251 | A1 | * | 9/2012 ............. F24J 2/5207 |

OTHER PUBLICATIONS

TopTile System, Document No. D10261-V1.2, Jul. 2023, Sunmodo Corporation, Vancouver, WA.
TopTile Mounting System Installation Manual, Mar. 2017, Sunmodo Corporation, Vancouver, Washington, downloaded from the Internet from https://sunmodo.com/wp-content/uploads/2015/04/TopTile-Mount-Installation-Manual.pdf on Jun. 21, 2023.
We Cracked the Code, TopTile Mount, Jun. 2017, Sunmodo Corporation, Vancouver, Washington, downloaded from the Internet from https://sunmodo.com/wp-content/uploads/2015/04/TopTile-Mount-One-Sheet- web.pdf on Jun. 21, 2023.
TopTile Installation Instructions, Aug. 2021, Sunmodo Corporation, Vancouver, Washington, downloaded from the Internet from https://knowledgebase.sunmodo.com/wp-content/uploads/2021/08/TopTile-Mount-Installation-Instruction.pdf on Jun. 21, 2023.
TopTile Mount Cutsheet, D10112-V004, Jan. 2021, Sunmodo Corporation Vancouver, Washington.
Say Yes to Tile Roofs, TopTile Mount, Feb. 2021, Sunmodo Corporation, Vancouver, Washington, downloaded from the Internet from https://knowledgebase.sunmodo.com/wp-content/uploads/2021/02/TopTile-One-Sheet-021521.pdf on Jun. 21, 2023.
FlexSeal Sealant—Datasheet, Document No. GAF1/05 COMC0308, Jan. 2023, GAF Materials Corporation, Parsippany, NJ.
FlexSeal Caulk Grade Sealant Product Datasheet, Jan. 2016, GAF Materials Corporation, Parsippany, NJ.
Iron Ridge TechTips: Installing Knockout Tile in Miami-Dade County with Approved 3-Course Flashing Method, Version 1.1, Mar. 2022, IronRidge, Inc., Hayward, California.
Chemlink M-1 Structural Adhesive/Sealant, Document No. DS1270, Apr. 2022, Chemlink Construction and Maintenance, Schoolcraft, Minnesota.
Lucas Professional Coatings, Sealants & Adhesives #9600 Joint & Termination Sealant, Aug. 2017, R.M. Lucas Co., Chicago, Illinois.
Millennium Hurricane Force Universal Sealer Extreme, Apr. 2022, Document No. 0141-10922, H.B. Fuller Company.
Tile Replacement Mount: For use with Flat, S & W shaped tiles, Rev 13, Document No. BI 7.2.3-40, Jan. 2020, QuickMountPV, Walnut Creek, California.
Installation Manual v.4 Solar Stack Mounting System for Flat and Pitched Roofs, Jul. 2022, Solar Stack Inc., Deerfield Beach, Florida.
Waterproofing Tile Roof Mount Sub-Flashing: Three-Course Method, Rev. 2, Dec. 2019, Quick Mount PV, Walnut Creek, California.
York 304 SA Self-Adhering Stainless Steel, Document No. Y0323, Mar. 2023, York Flashing, Stanford, Maine.
Roofing and Cladding Closure and Venting Products, Jul. 2016, downloaded from the Internet from https://f.hubspotusercontent30.net/hubfs/6069238/Butyl-Tape-Product-Data-Sheet.pdf on Jul. 26, 2023.
Installation Manual RT-[E]Mount 2 E Mount AIR 2, Jul. 2018, Roof Tech, Chula Vista, California.
APOC 501 Neoprene Flashing Sealant Technical Data Sheet, Apr. 2023, Gardner-Gibson, Inc., Tampa, Florida.
APOC 701 Polyset RTA-1 Roof Tile Adhesive Technical Data Sheet, Apr. 2023, Gardner-Gibson, Inc., Tampa, Florida.
EastoPatch Flexible Patching Compound Technical Datasheet, Aug. 2018, DAP Products Inc, Baltimore, Maryland.
3M Fire Block Foam FB-Foam Product Datasheet, Literature Order Info: 98-0213-4627-9, Mar. 2020, 3M Company, St Paul, Minnesota.
Great Stuff Gaps and Cracks Insulating Foam Sealant, Form No. 179-15217-0415 CDP, Apr. 2015, The Dow Chemical Company, Midland, Michigan.
Great Stuff Fireblock Insulating Foam, 43-D100013-enNA-1219 CDP, Jan. 2020, The Dow Chemical Company, Midland, Michigan.
OSI Quad Technical Datasheet, Ref # 253075, 442501, 442483, Aug. 2021, Henkel Corporation, Rocky Hill, Connecticut.
Leakseal Technical Datasheet, Feb. 2020, Rust-Oleum Corporation, Vernon Hills, Illinois.

* cited by examiner

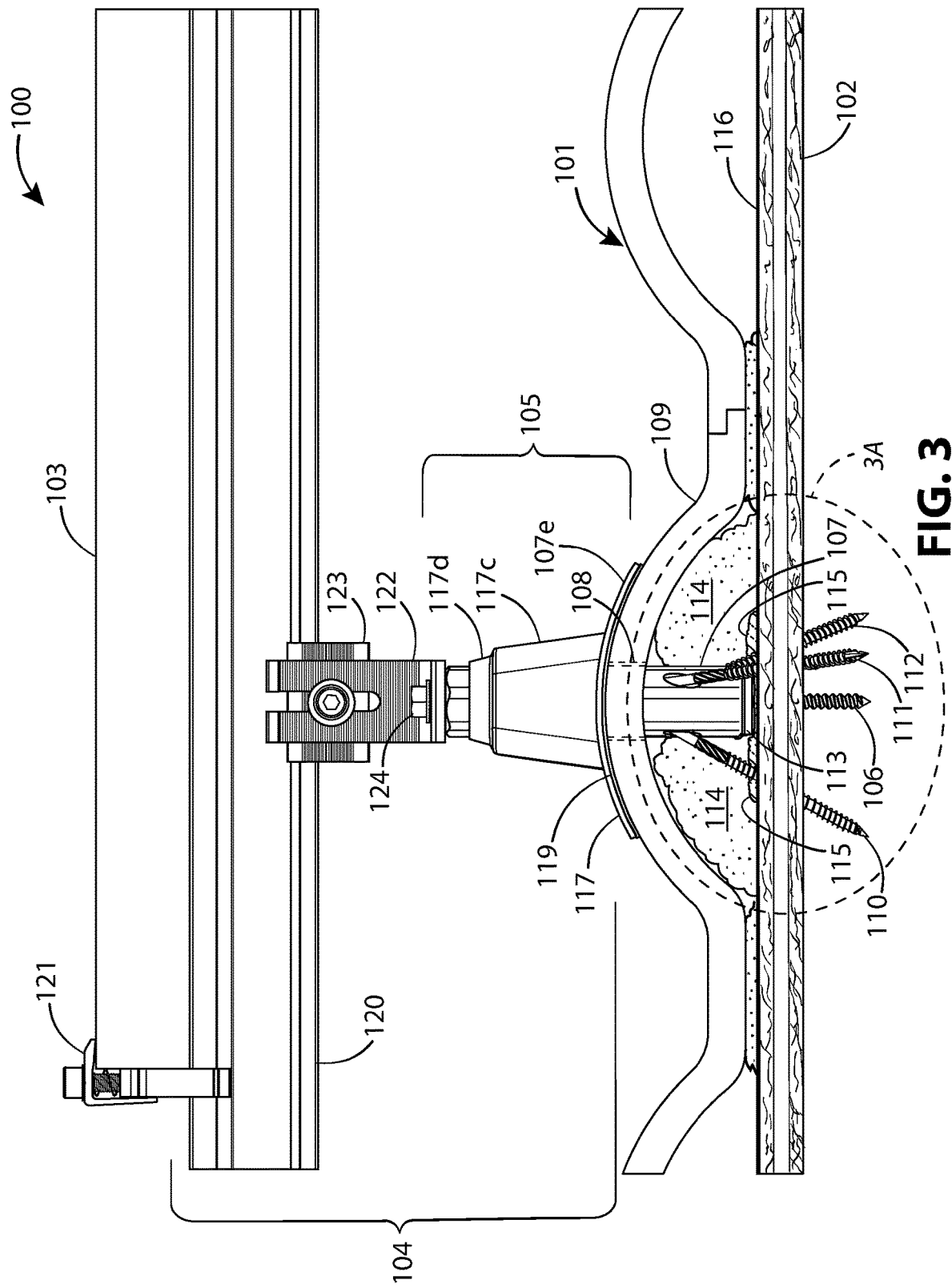

METHOD AND SYSTEM FOR SECURING A SOLAR PANEL TO A TILE ROOF

TECHNICAL FIELD

This disclosure relates to a broader class of supports and, more specifically, to brackets that are specially mounted and attached to roofs.

BACKGROUND

Residences and businesses typically mount solar panels on building roof tops or shade structures to generate electricity from sunlight. A solar panel racking system secures solar panels to such roofs and shade structures. A solar panel roof mounting assembly secures the solar panel racking system to the roof. Different roof types may require different solar panel roof mounting assemblies. For brevity, as used in this disclosure the term "roof mounting assembly" will refer to a "solar panel roof mounting assembly."

In the United States, asphalt shingles typically cover residential roofs. Tile roofs are an alternative to asphalt shingle roofs because of their appearance and durability. Roof mounting assemblies typically secure to the roof over the asphalt shingles. The asphalt shingles compress as the fasteners that secure the roof assembly engage the roof deck. In contrast, ceramic, slate, terracotta, or concrete roof tiles are rigid and typically are not compressible. Attempting to use a roof mounting assembly designed for an asphalt shingle roof, as described above, on a tile roof results in cracked tiles.

Roof mounting assemblies designed for tile roofs typically attach to the roof underlayment in the gap between the roof and the underside of the roof tiles. An installer will typically remove one or more roof tiles to mount the solar panel roof mounting assembly. After installing the roof mounting assembly, the installer will re-install the roof tile. The installer will often notch part of the tile to allow a portion of the mounting assembly to extend above the tile surface. The solar panel racking system secures to portions of the roof mounting assembly that extend above the tile.

SUMMARY

The Applicant developed a roof mounting assembly for tile roofs that does not require removal of roof tiles. Instead of removing roof tiles, an installer simply drills a hole in the roof tile and extends a stanchion through the hole. A double-sided threaded fastener extends downward from the bottom of the stanchion and secures the stanchion to the roof underlayment and roof deck. After securing the stanchion to the roof, an installer secures three or more threaded roof fasteners through apertures in the stanchion. These apertures extend obliquely through the sides of the stanchion above the roof tile and terminate through the sides of the stanchion below the roof tile. The ends of the threaded roof fasteners extend into the underlayment and roof deck beyond the stanchion bottom surface. This creates a secure attachment to the roof deck without tying the threaded roof fasteners into the roof rafters, joists, purlins, or truss chords.

A challenge faced by the inventors was to secure the above-described stanchion and threaded roof fasteners to tile roofs subjected to extreme wind and rain events such as hurricanes, typhoons, and other tropical cyclones. To this end, the inventors discovered a method where, without removing roof tiles, an installer positions the stanchion through the hole in the roof tile discussed above, and onto a layer of polyurethane foam positioned over a layer of waterproof roof adhesive sealant. Using the double-sided threaded fastener and the three or more threaded roof fasteners described above, the installer extends the fasteners through the layer of polyurethane foam and layer of waterproof roof adhesive sealant, and into the roof deck. The waterproof adhesive sealant bonds to the roof underlayment and creates a waterproof seal between the fasteners and the roof deck.

After securing the stanchion to the tile roof, the installer may optionally form roof-flashing to the shape of the roof tile and position the roof-flashing over the stanchion and the roof tile. The roof-flashing may optionally include an integrated elastomeric boot. The integrated elastomeric boot includes an opening, or "mouth," that stretches around the upper portion of the stanchion and covers the threaded roof fasteners. This helps to prevent water infiltration into the system. In addition, the roof-flashing may include a layer of butyl rubber adhered to the underside of the roof-flashing. This butyl rubber may be a butyl rubber sheet. This is typically a peel-and-stick sheet of butyl rubber that can be pre-attached to the roof-flashing. The butyl rubber forms a tight wind-resistant and waterproof bond between the flashing and the roof tile. This prevents water migrating down the roof from entering the system. Together, the polyurethane foam, waterproof roof adhesive sealant, butyl rubber sheet, roof-flashing, and integrated elastomeric boot provide several layers of water protection. The polyurethane foam, waterproof roof adhesive sealant, butyl rubber sheet, and the stanchion in combination with the obliquely-positioned roof fasteners provide a strong wind-resistant structure.

An example of the system and method described in this disclosure that includes the combination of polyurethane foam and waterproof roof adhesive sealant, received a Notice of Acceptance for use in Miami-Dade Country, Florida. Miami-Dade Country, Florida is among the strictest building codes in the United States for resistance to high velocity hurricanes.

This Summary discusses a selection of examples and concepts. These do not limit the claims to the examples given. Additional features and advantages will be apparent from the Detailed Description, figures, and claims.

BRIEF DESCRIPTION OF DRAWINGS

FIG. 3 illustrates, in front view, the tile roof mounting system, solar panel, and tile roof of FIG. 1, with a section view of the tile roof and roof deck.

DETAILED DESCRIPTION

The Detailed Description and Claims may use ordinals such as "first," "second," or "third," to differentiate between similarly named parts. These ordinals do not imply order, preference, or importance. This disclosure uses "optional" to describe features or structures that are optional. Not using the word "optional" does not imply a feature or structure is not optional. In this disclosure, "or" is an "inclusive or," unless preceded by a qualifier, such as either, which signals an "exclusive or." As used throughout this disclosure, "comprise," "include," "including," "have," "having," "contain," "containing" or "with" are inclusive, or open ended, and do not exclude unrecited elements.

The Detailed Description includes the following sections: Definitions, System Overview Example, Example of Tile Roof Mounting Assembly, Example of a Method for Securing the Tile Roof Mounting Assembly, and Conclusion and Variations.

Definitions

Roof adhesive sealant: As defined in this disclosure a roof adhesive sealant is a non-foam sealant with adhesive and waterproof properties suitable for use on a roof.

Tile roof: as defined in this disclosure, a tile roof is a roof that uses a non-compressible or rigid tiles such as ceramic roof tiles, porcelain roof tiles, cement or concrete roof tiles, slate roof tiles, terracotta roof tiles, and clay roof tiles. This contrasts with an asphalt shingle roof that uses compressible or flexible asphalt shingles.

System Overview Example

Figure 1:
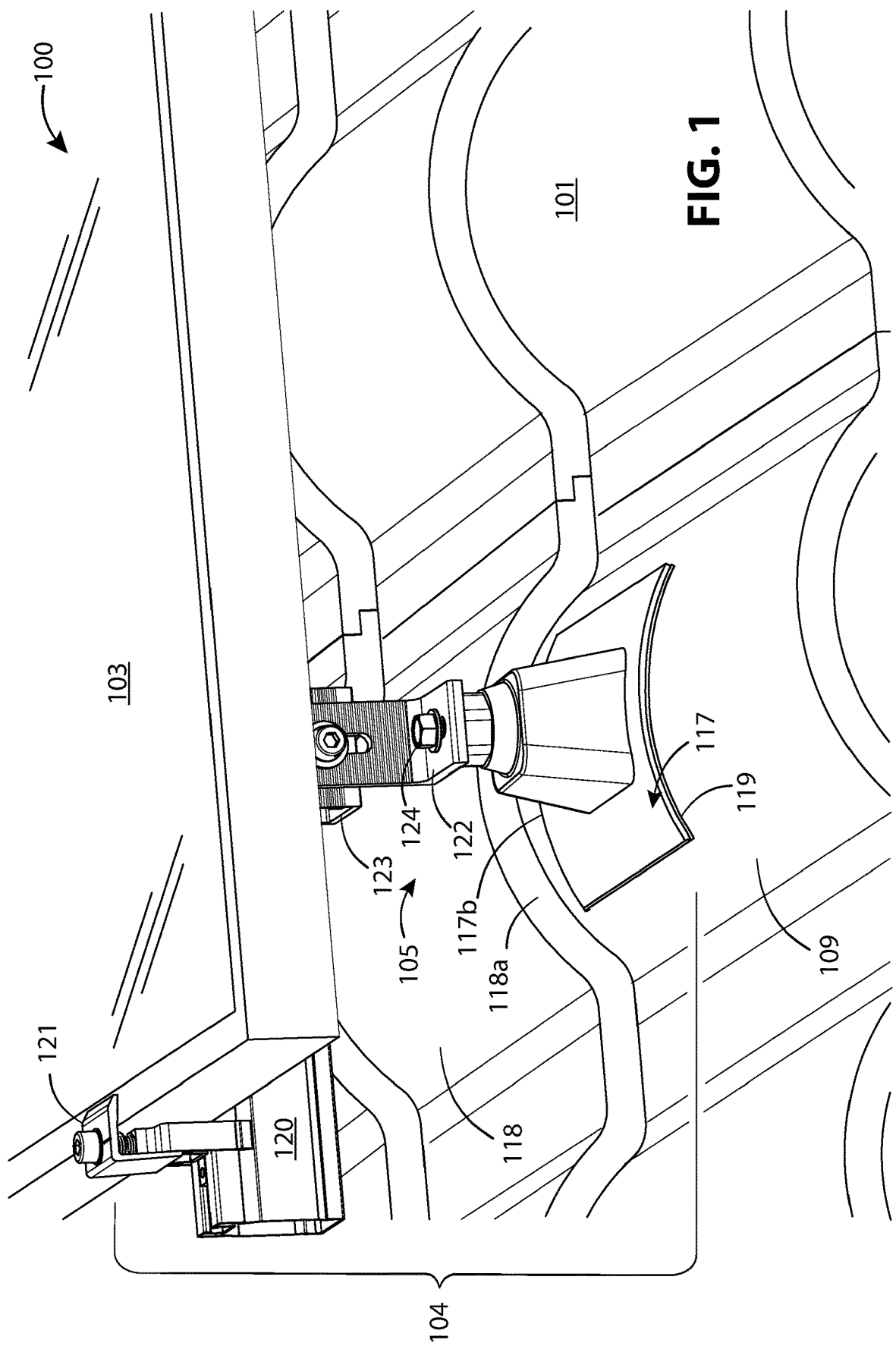
FIG. 1 illustrates, in isometric view, an example of a tile roof mounting system of the present disclosure securing a solar panel, to a tile roof.
Figure 2:
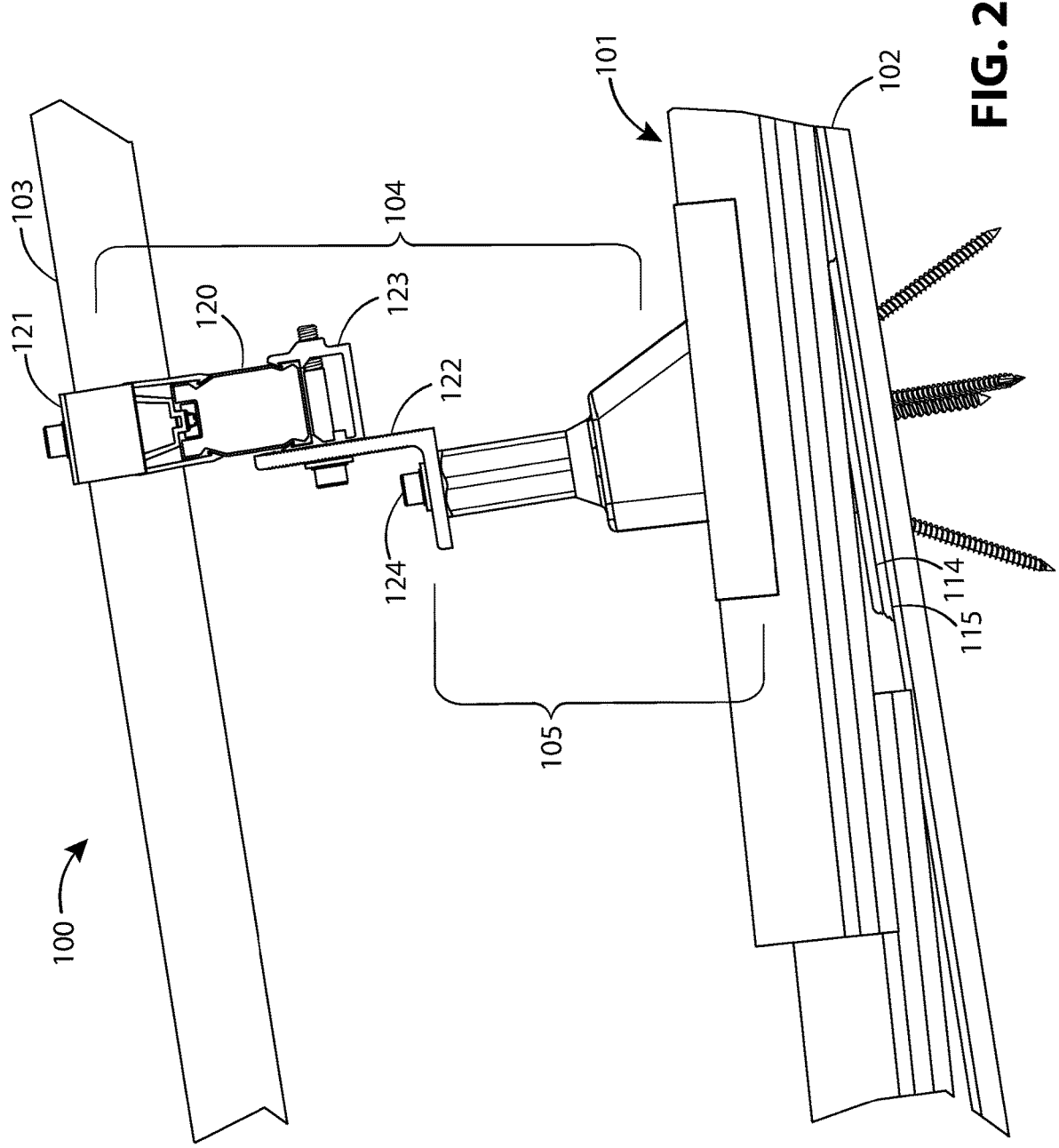
FIG. 2 illustrates, in side view, the tile roof mounting system, solar panel, and tile roof of FIG. 1, with the roof deck and cavity below the roof deck cutaway for illustration.

FIGS. 1-3 provide an example of a system 100 for securing a solar panel to a tile roof 101. This is a simplified system. The principles discussed can extend to systems that include hundreds of solar panels. FIG. 1 illustrates the system 100 in isometric view. FIG. 2 illustrates the system 100, in side view, with a portion of the tile roof 101 above and below the roof deck 102 cutaway. FIG. 3 illustrates the system 100 in front view with the tile roof 101 and roof deck 102 shown in section view. Referring to FIGS. 1-3, the system may include a solar panel 103 secured to a solar panel racking system 104. The solar panel racking system 104 may include a tile roof mounting assembly 105 that secures the solar panel racking system 104 and solar panel 103 to the tile roof 101 and roof deck 102.

The system has several advantages. For example, an installer may install the system 100 without removal of roof tiles from the tile roof 101. The system 100 can withstand driving rain and wind pressure from hurricanes, typhoons, and other tropical cyclones.

Referring to FIG. 3, a double-ended threaded fastener 106 extends downward from the bottom of a stanchion 107 and into the roof deck 102. The stanchion 107 extends through a hole 108 in a roof tile 109. The threaded roof fasteners 110, 111, 112 extends obliquely through apertures in the stanchion 107 and into the roof deck 102. The threaded roof fasteners enter the apertures above the tile roof 101 and exit the apertures below the tile roof 101. This allows an installer to secure the stanchion 107 to the roof deck 102 without removing roof tiles from the tile roof 101. The threaded roof fasteners 110, 111, 112, extend beyond the outside perimeter of the stanchion 107 and form a stable platform that prevents pullup from the roof deck 102.

Figure 3A:
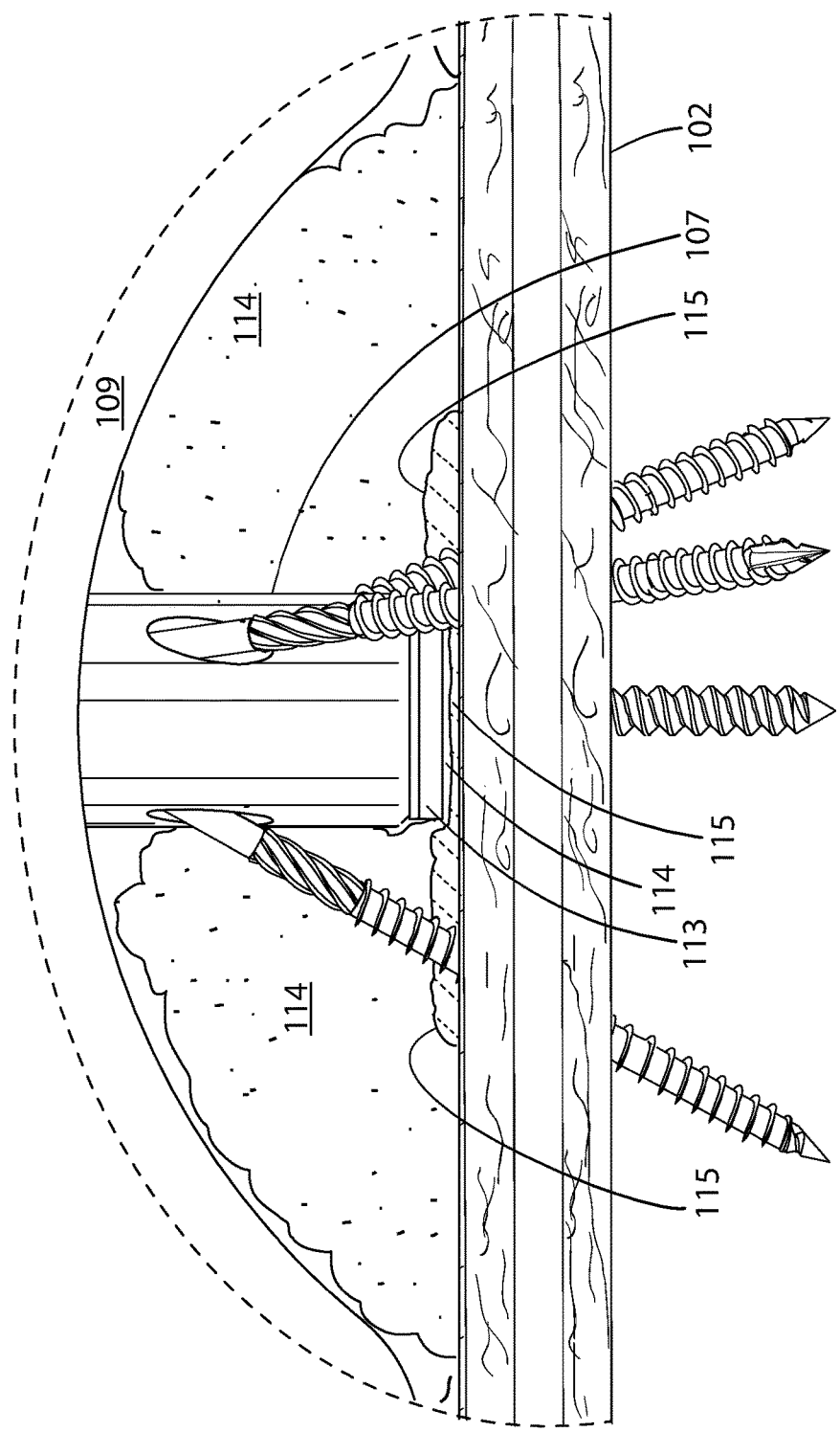
FIG. 3A illustrates a portion of FIG. 3 showing the relationship between the stanchion, roof adhesive sealant, polyurethane foam, and roof deck in greater detail.

An elastomeric gasket 113 optionally extends downward from the bottom of the stanchion 107. The stanchion 107, and optionally, the elastomeric gasket 113 seats over a layer of polyurethane foam 114. The layer of polyurethane foam 114 seats over a layer of roof adhesive sealant 115. The layer of roof adhesive sealant 115 adheres to the roof underlayment 116. The roof underlayment 116 secures to the roof deck 102. The inventors discovered that the combination of roof adhesive sealant 115 and polyurethane foam 114 provides superior waterproofing and adhesion of the stanchion 107. This helps to prevent the stanchion 107 from pulling out of the roof deck 102 under severe weather conditions such as hurricanes, typhoons, or other tropical cyclones. The polyurethane foam 114 also surrounds the stanchion 107 providing an extra layer of waterproofing and resistance to pullout. FIG. 3A illustrates a portion of FIG. 3 showing the relationship between the stanchion 107, roof adhesive sealant 115, polyurethane foam 114, and roof deck 102 in greater detail. The stanchion 107, and optionally, the elastomeric gasket 113, compress the roof adhesive sealant 115, polyurethane foam 114 against the roof deck. FIG. 2 also illustrates portions of the polyurethane foam 114 and roof adhesive sealant 115.

One of the inventors' contribution was the discovery that combining two materials not normally combined for the installation of a tile roof mounting assembly, provided superior waterproofing and pullout strength. Superior adhesion and waterproofing results from the combination of these two materials in the order described. In addition, superior adhesion, and waterproofing results from screwing in the stanchion 107 to the roof deck 102 before the roof adhesive sealant 115 and before the polyurethane foam 114 fully cures. Examples of polyurethane foam 114 include APOC® Polyset RTA-1 Roof Tile Adhesive Foam, GREAT STUFF™ Gaps and Cracks Insulating Foam Sealant, GREAT STUFF™ Fireblock Insulating Foam Sealant, and 3M™ Fire Block Foam FB-Foam. Examples of products suitable as roof adhesive sealant 115 include, APOC®

Super-Flash Roof and Flashing Sealant, DAP® ELASTO-PATCH® Flexible Patching Compound, and RUST-OLEUM® LEAKSEAL®.

Typically, flashing systems for mounting solar panel roof mounting assemblies require tucking the trailing edge of the roof-flashing under the leading edge of the adjacent tile to prevent water from seeping under the trailing edge of the roof-flashing and to prevent pullup of the roof-flashing from wind. Referring to FIG. 1, the tile roof mounting assembly 105 does not require tucking the trailing edge 117b of the roof-flashing 117 under the leading edge 118a of the adjacent tile, roof tile 118. Referring to FIGS. 1 and 3, a butyl rubber pad 119 may optionally be adhered to the underside of the roof-flashing 117, and the roof tile 109 as illustrated. The butyl rubber pad 119 may be a peel-and-stick butyl sheet. The peel-and-stick butyl sheet may be adhered to the underside, or bottom, of the flashing by the manufacturer. The installer can peel away the protective paper backing from the peel-and-stick butyl sheet during installation. The butyl rubber pad 119 provides enough adhesion to prevent pullup of the roof-flashing under extreme weather conditions such as hurricanes, typhoons, or other tropical cyclones. The water-repelling properties of the butyl rubber resist infiltration from water rolling down the roof, or from driving rain leaking under the roof-flashing 117.

Referring to FIG. 3, the roof-flashing 117 may include an elastomeric boot that integrates with the metal flashing 117e, for example, integrated elastomeric boot 117c. The mouth 117d of the integrated elastomeric boot 117c stretches over the stanchion 107 and creates a water-resistant seal. The integrated elastomeric boot 117c may be ethylene propylene diene monomer (EPDM). The integrated elastomeric boot 117c may be any flexible waterproof or strongly water-resistant material that can withstand the environmental conditions of a solar panel installation. Other examples of possible suitable materials for the integrated elastomeric boot 117c may include neoprene and silicone.

The tile roof mounting assembly 105 of FIGS. 1-3 is versatile. An installer may use it in various styles of solar panel racking systems, such as rail-based or rail-less systems. FIGS. 1-3 illustrate a simplified example of a rail-based system. In addition to the solar panel 103, the system may include a rail 120 and solar panel clamp 121 that clamps the solar panel 103 to the rail 120. An L-foot 122 may secure the tile roof mounting assembly 105 to the rail 120 using a threaded fastener 124. Optionally, the L-foot 122 in combination with an L-foot adapter 123 may secure the rail 120 to the tile roof mounting assembly 105.

Example of a Tile Roof Mounting Assembly.

Figure 4:
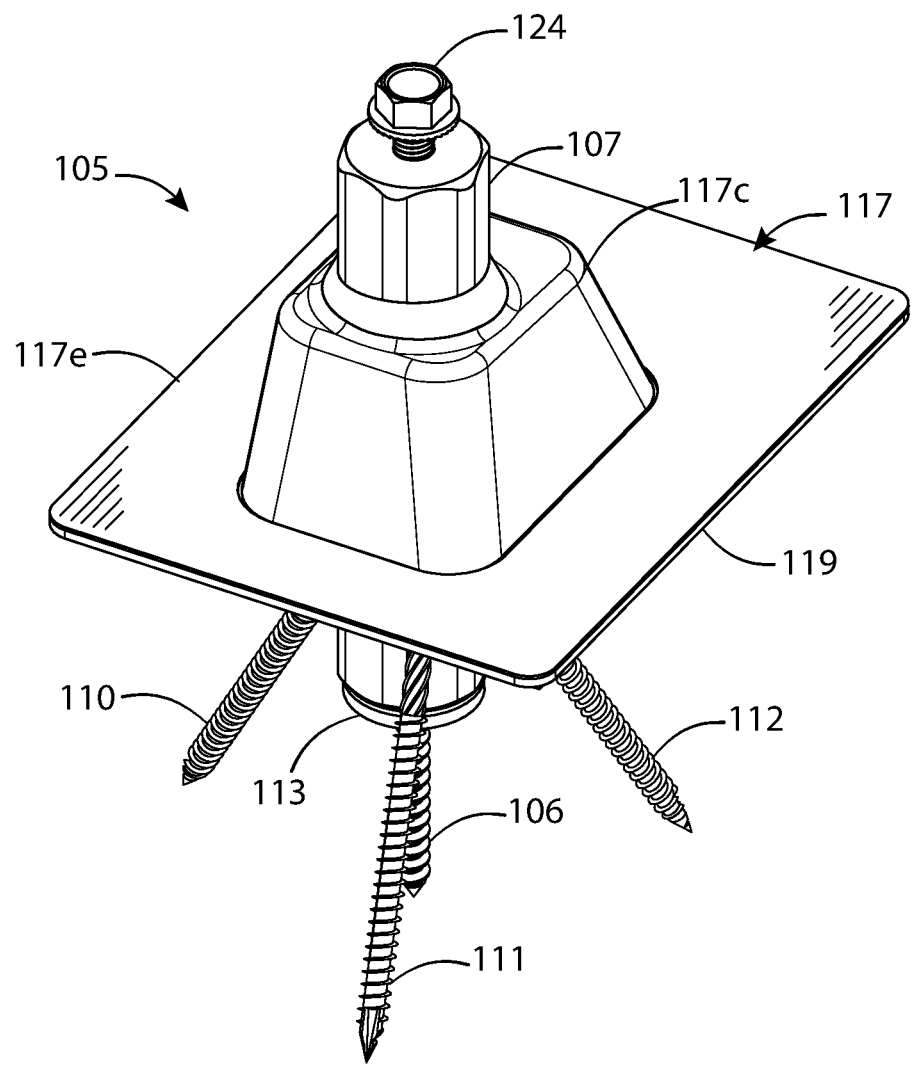
FIG. 4 illustrates, in isometric view, the tile roof mounting assembly of FIG. 1.
Figure 5:
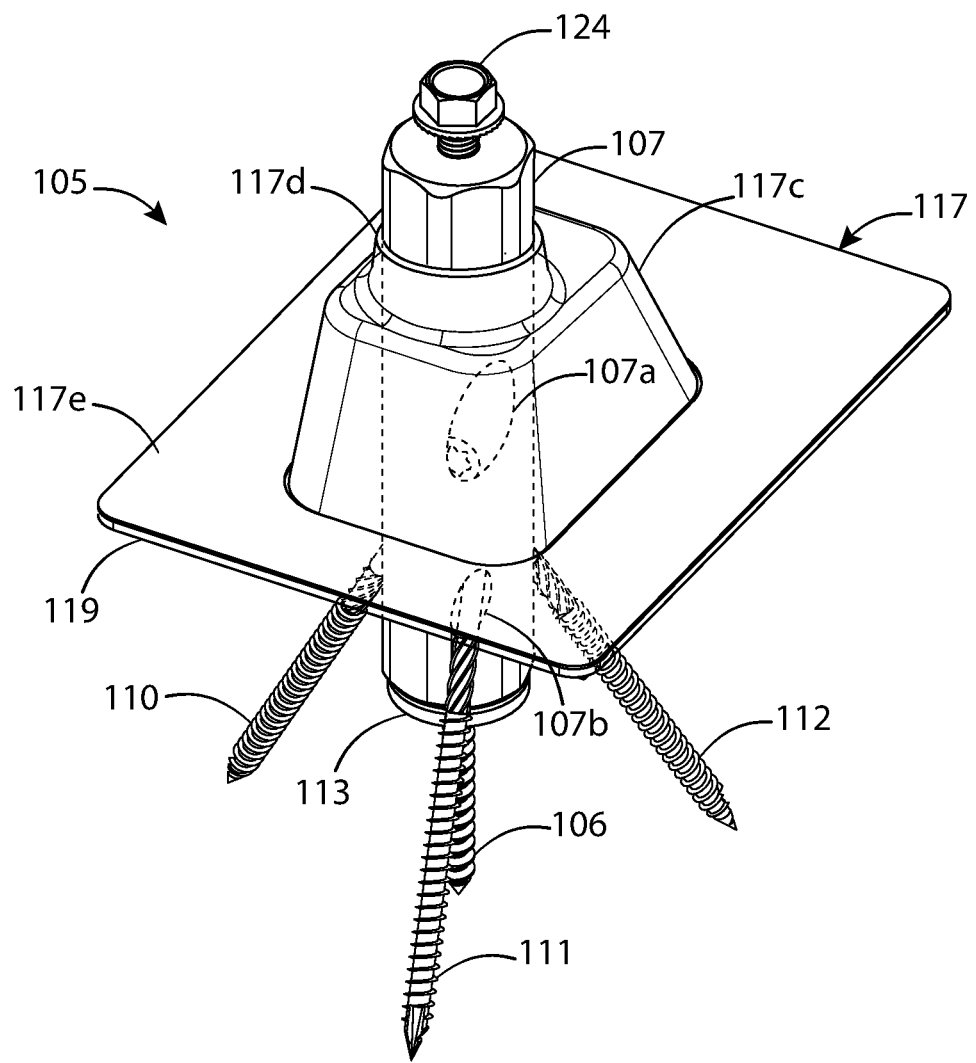
FIG. 5 illustrates, the tile roof mounting assembly of FIG. 1 with dashed lines representing portions under the flashing hidden from view.
Figure 6:
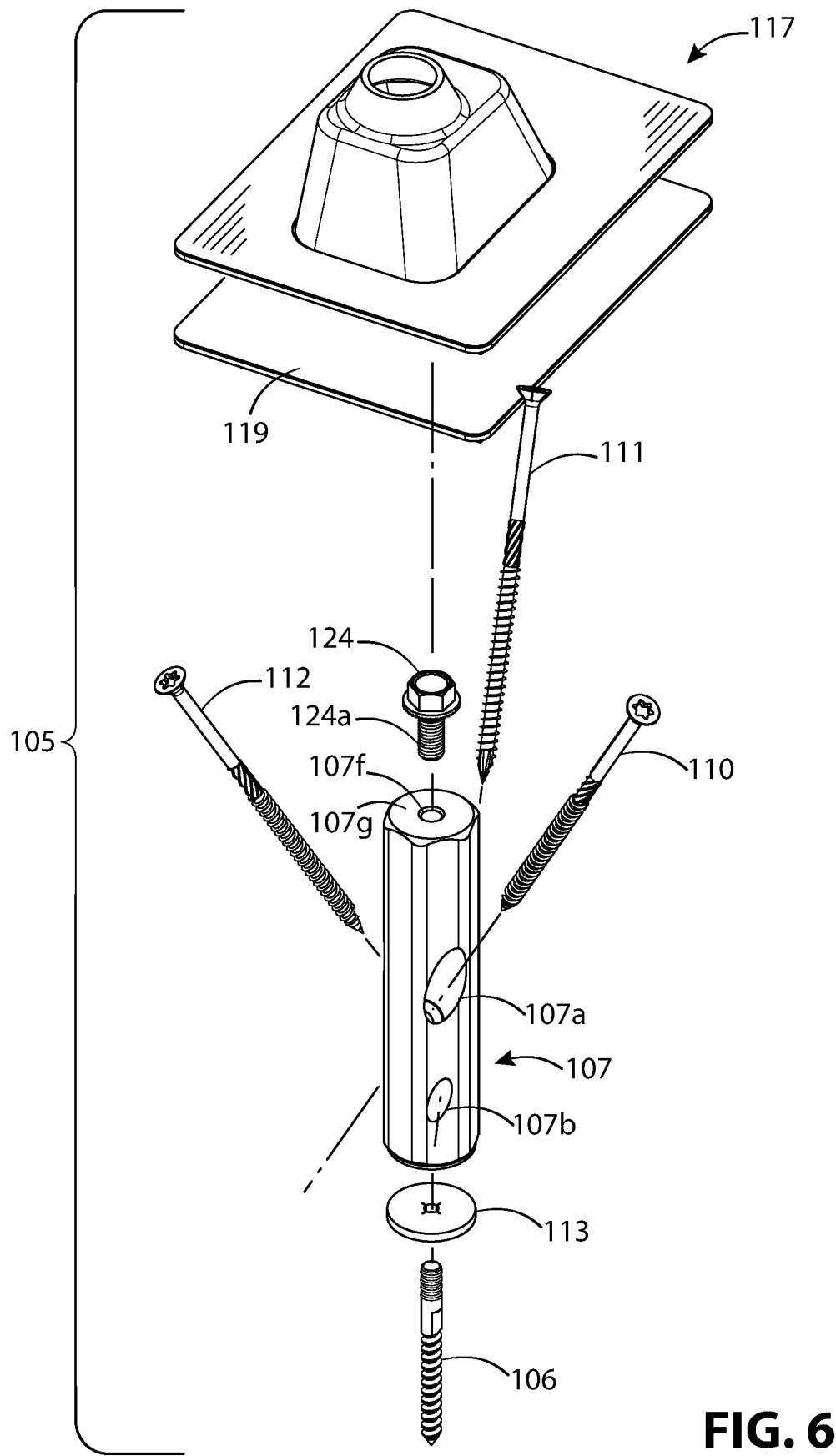
FIG. 6 illustrates, in exploded isometric view, the tile roof mounting assembly of FIG. 1.
Figure 7:
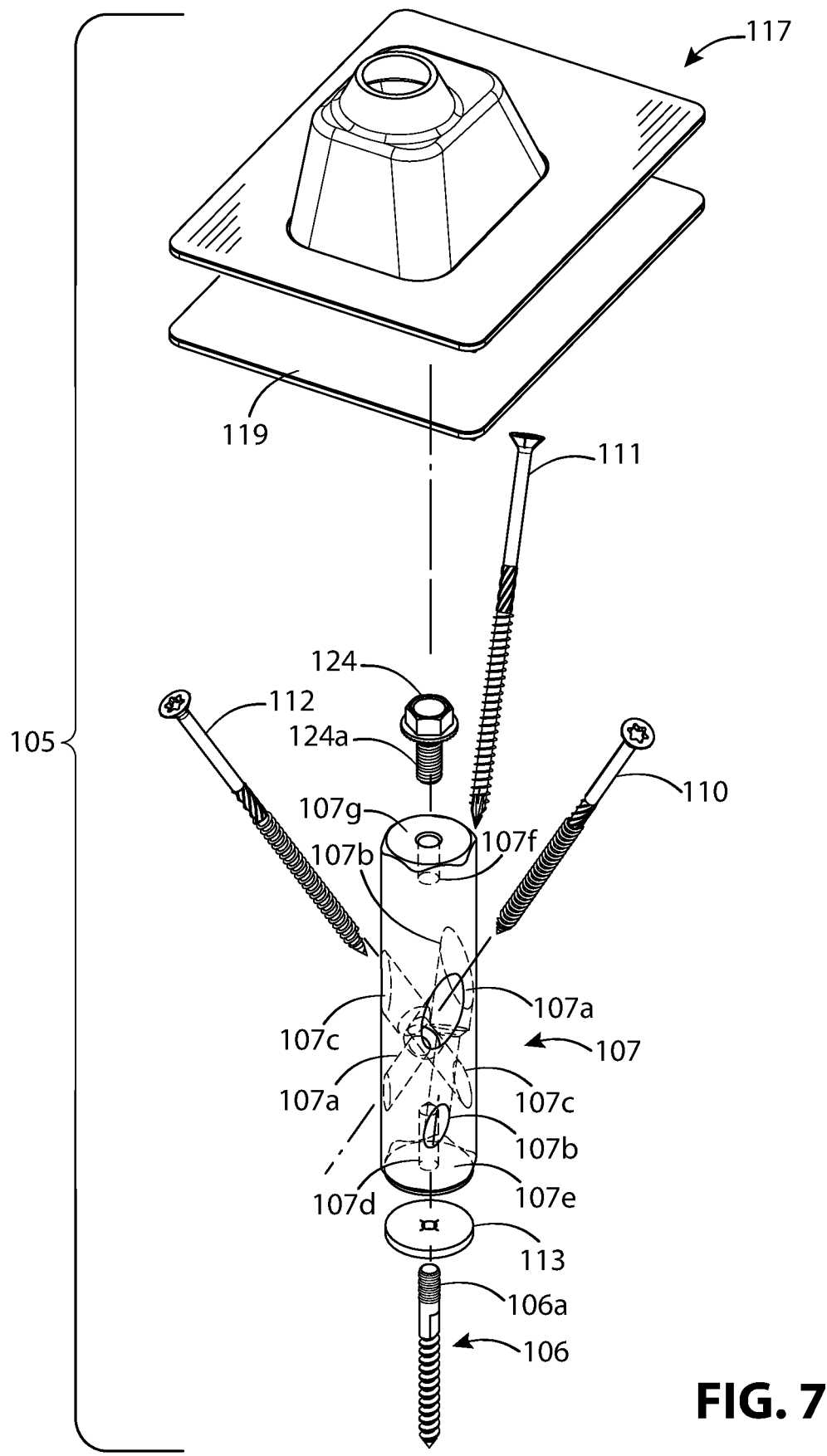
FIG. 7 illustrates, in exploded isometric view, the tile roof mounting assembly of FIG. 1, dashed lines in FIG. 7 represent portions of the stanchion hidden from view.

FIGS. 4-7 illustrate the tile roof mounting assembly 105 of FIGS. 1-3 in various views. FIG. 4 illustrates the tile roof mounting assembly 105 in isometric view. FIG. 5 illustrates the tile roof mounting assembly 105 with dashed lines representing portions under the flashing hidden from view. FIG. 6 illustrates the tile roof mounting assembly 105 in exploded isometric view. FIG. 7 illustrates the tile roof mounting assembly 105 in exploded isometric view, where dashed lines represent portions of the stanchion 107 hidden from view.

FIGS. 4-7 illustrate relationships between the stanchion 107, roof-flashing 117, double-ended threaded fastener 106, the threaded roof fasteners 110, 111, 112, the elastomeric gasket 113, the butyl rubber pad 119, and the threaded fastener 124. Referring to FIG. 7, the three or more threaded roof fasteners, the threaded roof fasteners 110, 111, 112, extend obliquely through apertures 107a, 107b, 107c, respectively. FIGS. 5 and 6 also illustrate the entrance of aperture 107a and the exit of aperture 107b, with the other aperture hidden from view. Referring to FIGS. 4 and 5, the integrated elastomeric boot 117c, which extends upward from the metal flashing 117e, covers the apertures and their corresponding roof fasteners and protects them from water infiltration. As previously discussed in FIG. 3, the mouth 117d elastically stretches around stanchion 107 to create a watertight seal. Referring again to FIG. 7, the entrances of apertures 107a, 107b, 107c are above the roof-flashing 117 and therefore above the roof line while the exits of apertures 107a, 107b, 107c are below the roof line.

Referring to FIGS. 6 and 7, the double-ended threaded fastener 106 may be a hanger bolt with a machine threading on one end and wood screw threading on the other. Referring to FIG. 7, machine-threaded end 106a, may extend through the elastomeric gasket 113 and may engage a threaded aperture 107d in the stanchion bottom 107e.

Referring to FIGS. 6 and 7, the threaded fastener 124 includes a threaded body 124a, shown with machine threading. The threaded body 124a engages a threaded aperture 107f positioned in the stanchion top 107g.

Example of a Method for Securing Tile Roof Mounting Assembly.

Figure 8:
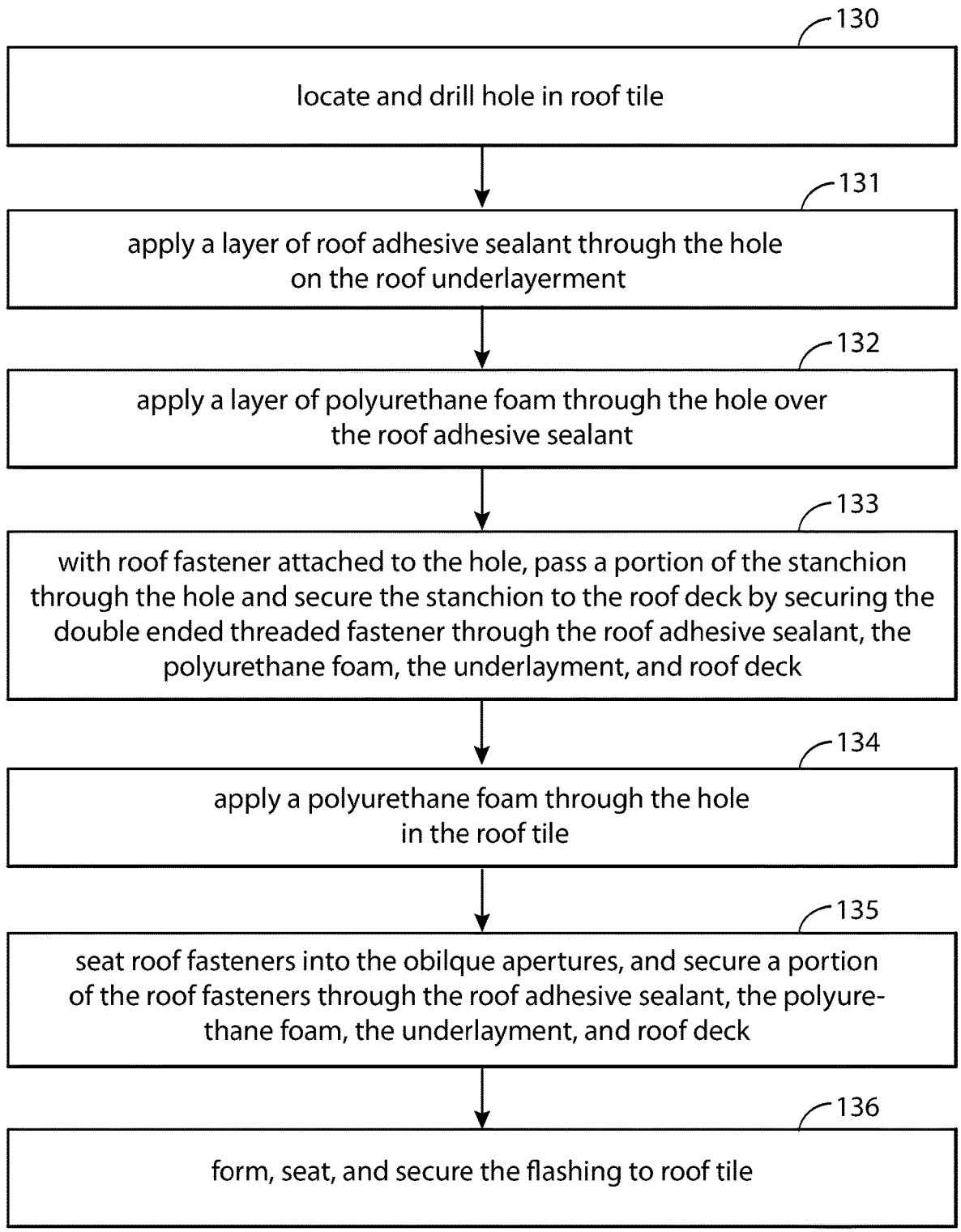
FIG. 8 illustrates a method for assembling the tile roof mounting assembly to a tile roof.
Figure 9:
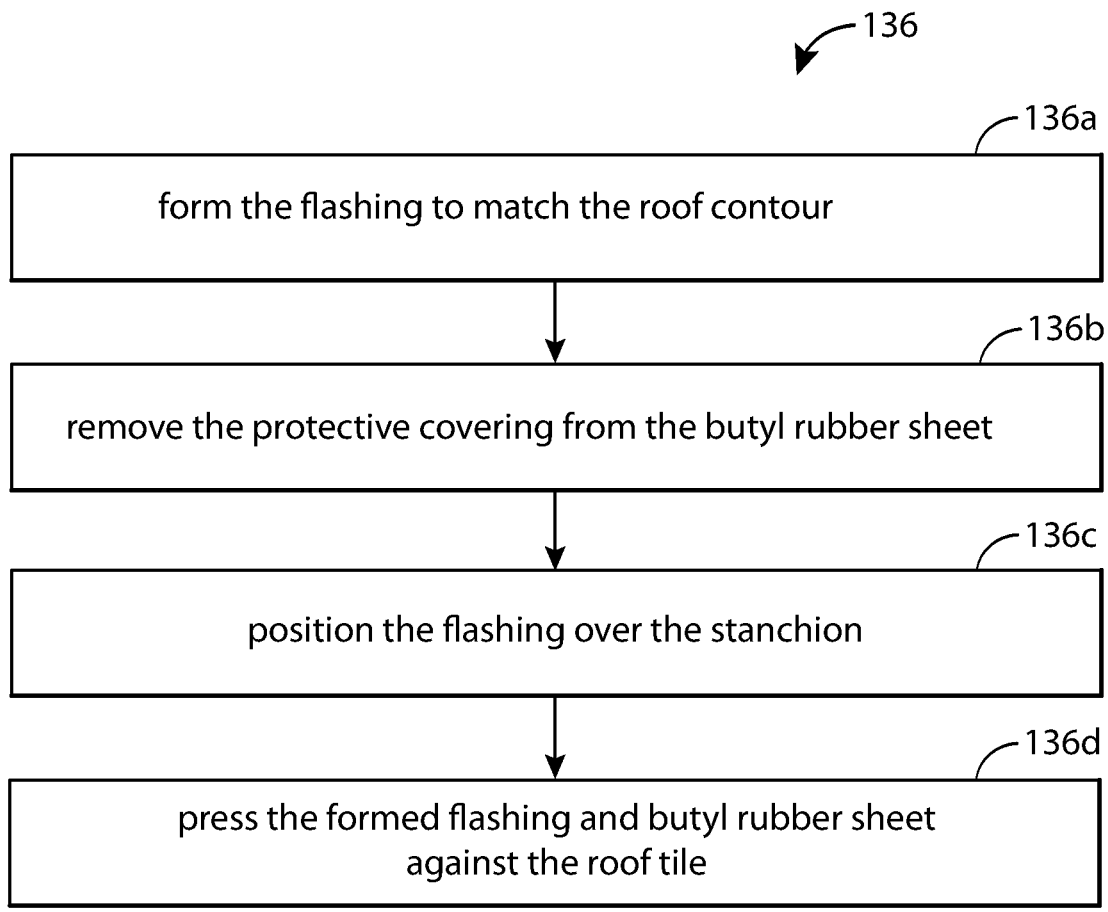
FIG. 9 illustrates in greater detail, the step of seating and securing the flashing to the roof tile.
Figure 17:
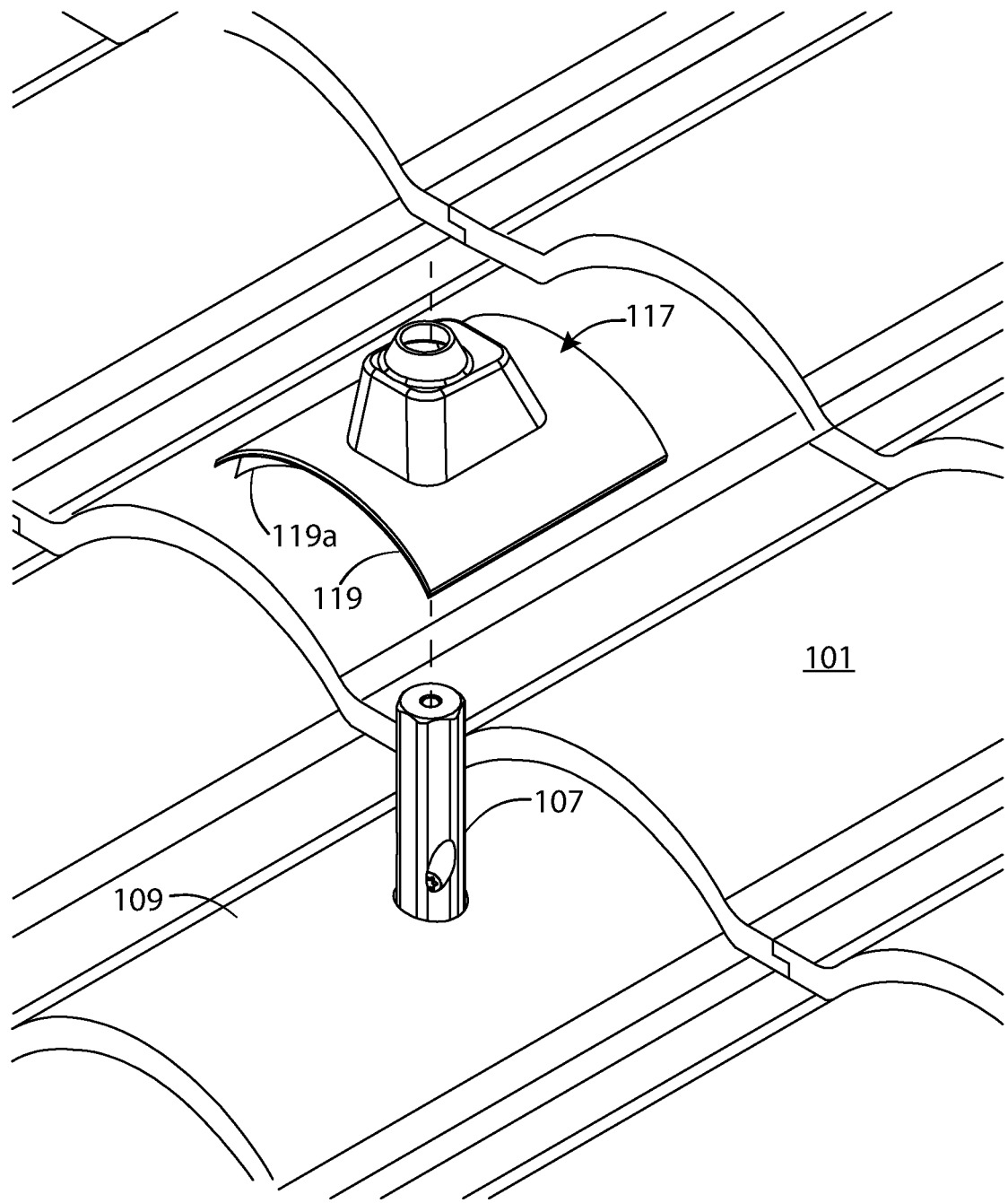
Figure 18:
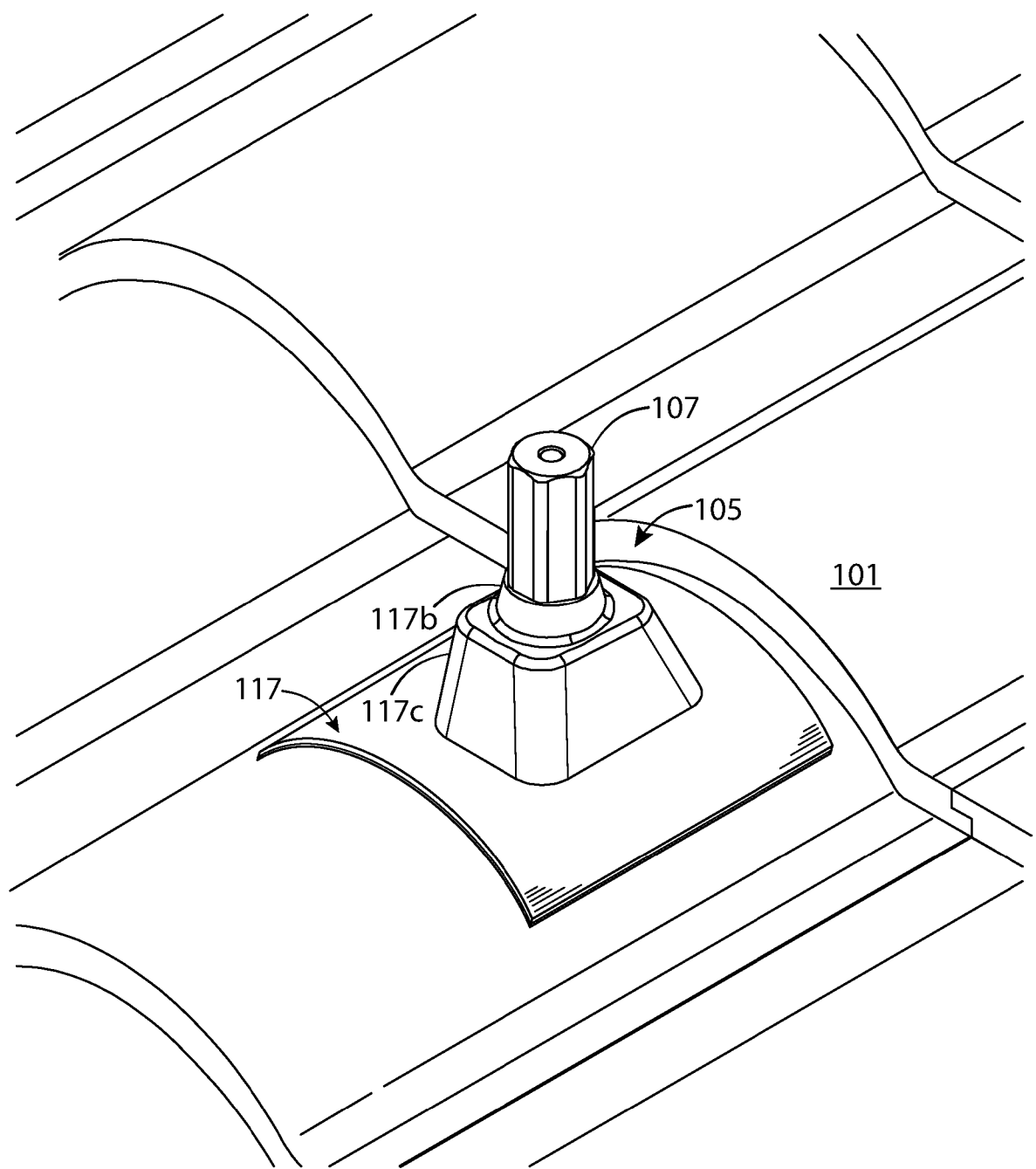
FIG. 18 illustrates the tile roof mounting assembly attached to the tile roof that results from the assembly sequence in FIGS. 8, 9, and 10-17.

FIG. 8 illustrates a method for assembling the tile roof mounting assembly to a tile roof. FIG. 9 illustrates in greater detail, the step 136 of seating and securing the flashing to the roof tile. FIGS. 10-17 illustrate the steps of FIGS. 8 and 9. An installer can perform the sequence of FIGS. 8 and 9 and illustrated in FIGS. 10-17 without removal of any roof tiles. FIG. 18 illustrates the result of FIGS. 8, 9, and 10-17. In the following paragraphs, when referring to FIG. 8 or 9 together with any of FIGS. 10-17, installation steps refer to FIG. 8 or 9, and structural elements refer to the other referenced figures.

Figure 10:
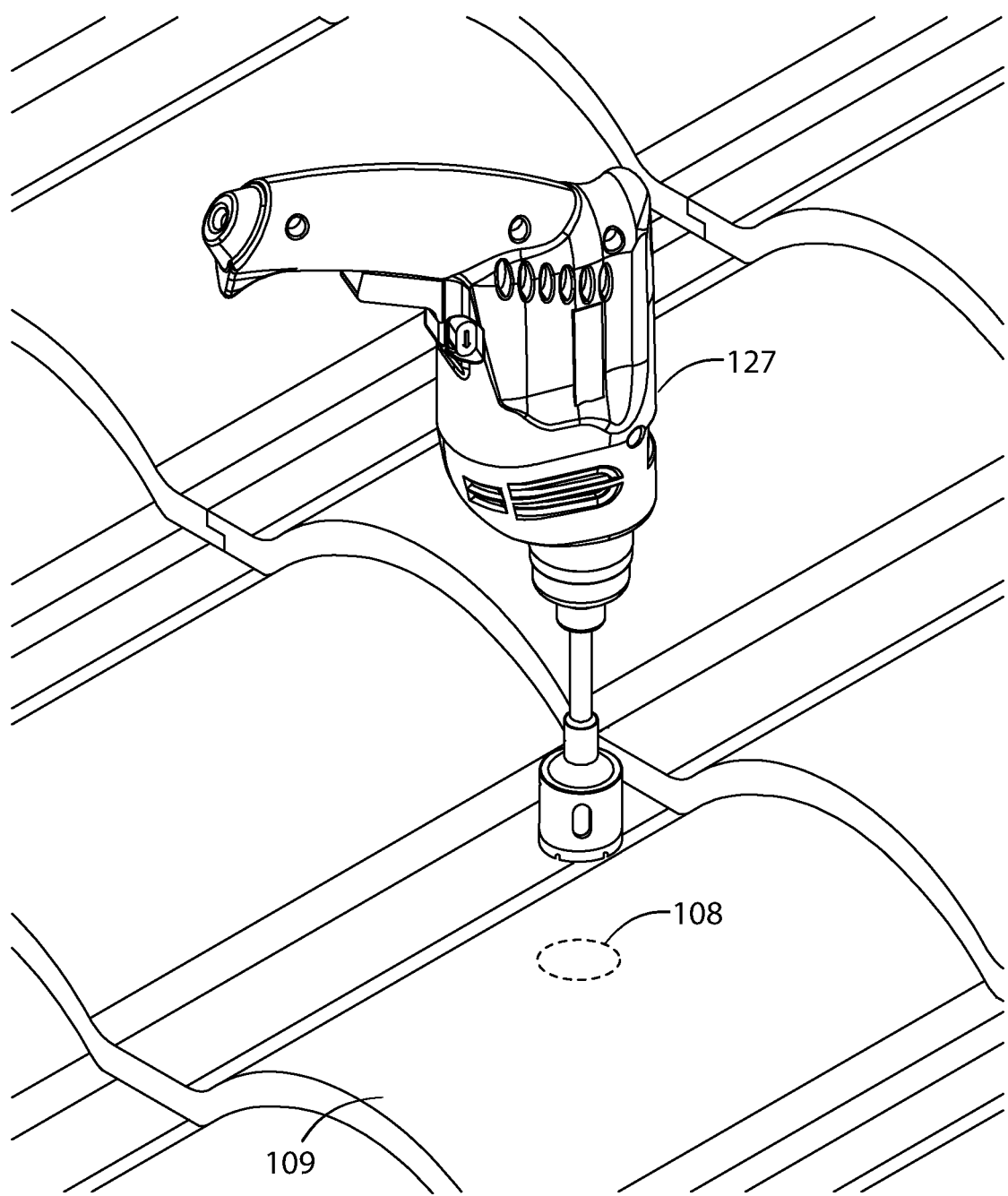
FIG. 10 illustrates the step of locating and drilling the hole in the tile roof.

Referring to FIGS. 8 and 10, in step 130, the installer drills a hole 108 in a roof tile 109. The hole is as large or larger than the outside diameter of the stanchion 107 of FIG. 3. FIG. 10 shows a power tool 127 represented as an electric drill. The tool for drilling the hole 108 can be any suitable hand tool or power tool and bit combination capable of drilling a hole in a roof tile. The installer may size the hole 108 to allow for thermal expansion of the stanchion 107 as compared with the roof tile 109. For example, a stanchion 107 made from 6061 aluminum alloy has a coefficient of thermal expansion approximately four times that of clay tile. A small gap of approximately 0.05 mm to 0.1 mm may be sufficient for an 80° C. variation of a stanchion of 30 mm in diameter.

Figure 11:
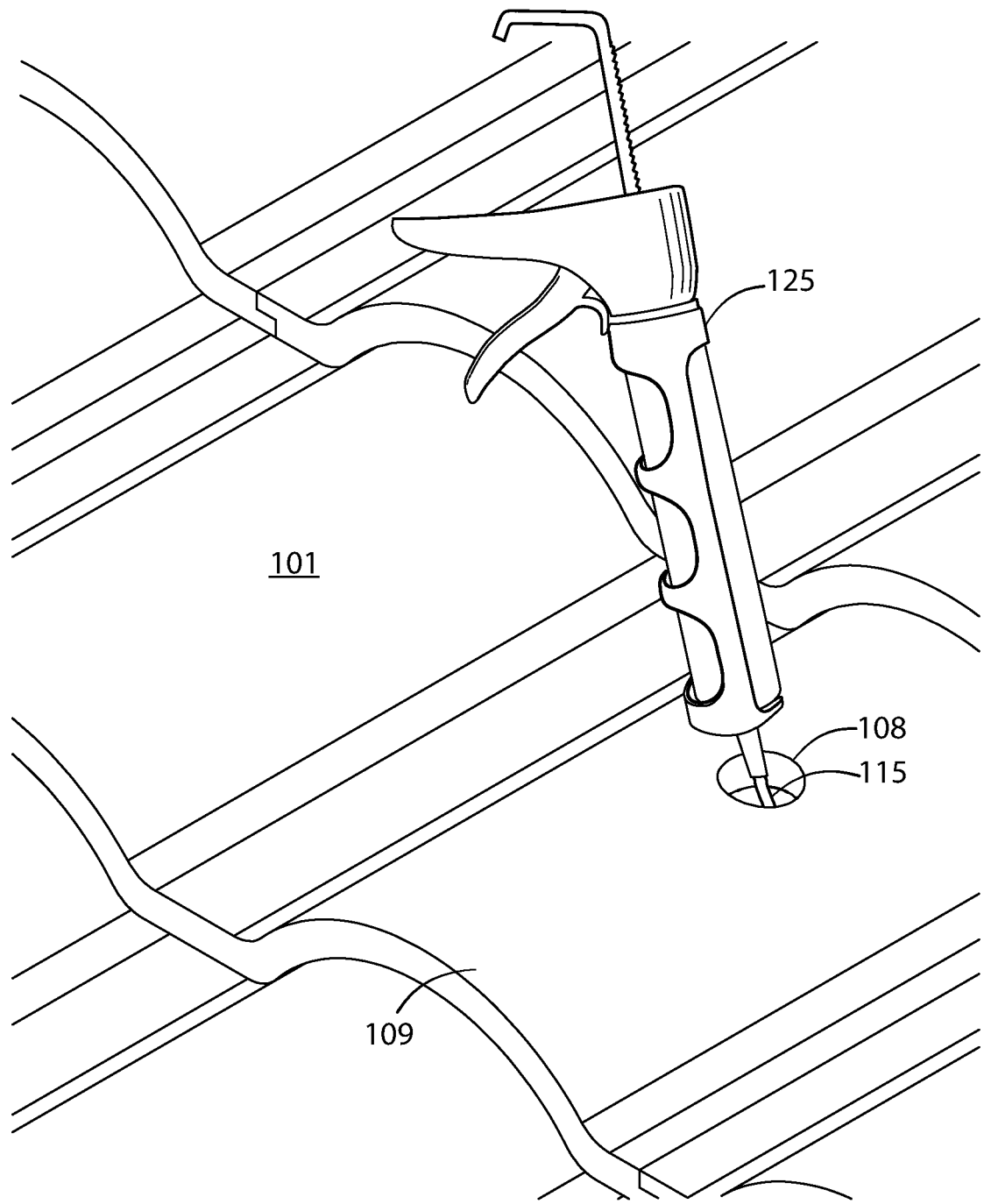
FIG. 11 illustrates the step of applying a layer of roof adhesive sealant through the hole onto the roof underlayment.

Referring to FIGS. 8 and 11, after the installer drills the hole 108 in the roof tile 109 of the tile roof 101, in step 131 the installer places a layer of roof adhesive sealant 115 through the hole 108 onto the roof underlayment 116 of FIG. 3. FIG. 11 illustrates the roof adhesive sealant 115 applied with a caulking gun 125. The installer may apply the roof adhesive sealant 115 with a caulking gun, sausage gun, a brush, or a spatula. The installer may use any tool that allows them to apply a uniform layer through the hole 108. Typically, the installer can apply a layer of roof adhesive sealant 115 wide enough to cover the stanchion and the three or more threaded roof fasteners, the threaded roof fasteners 110, 111, 112 of FIG. 3. For a 1.1-inch (0.0 279 m) diameter stanchion with the threaded fasteners angled as illustrated, the diameter of the layer of the roof adhesive sealant 115 may be 4 to 6 inches (0.102 m to 0.152 m)

Figure 12:
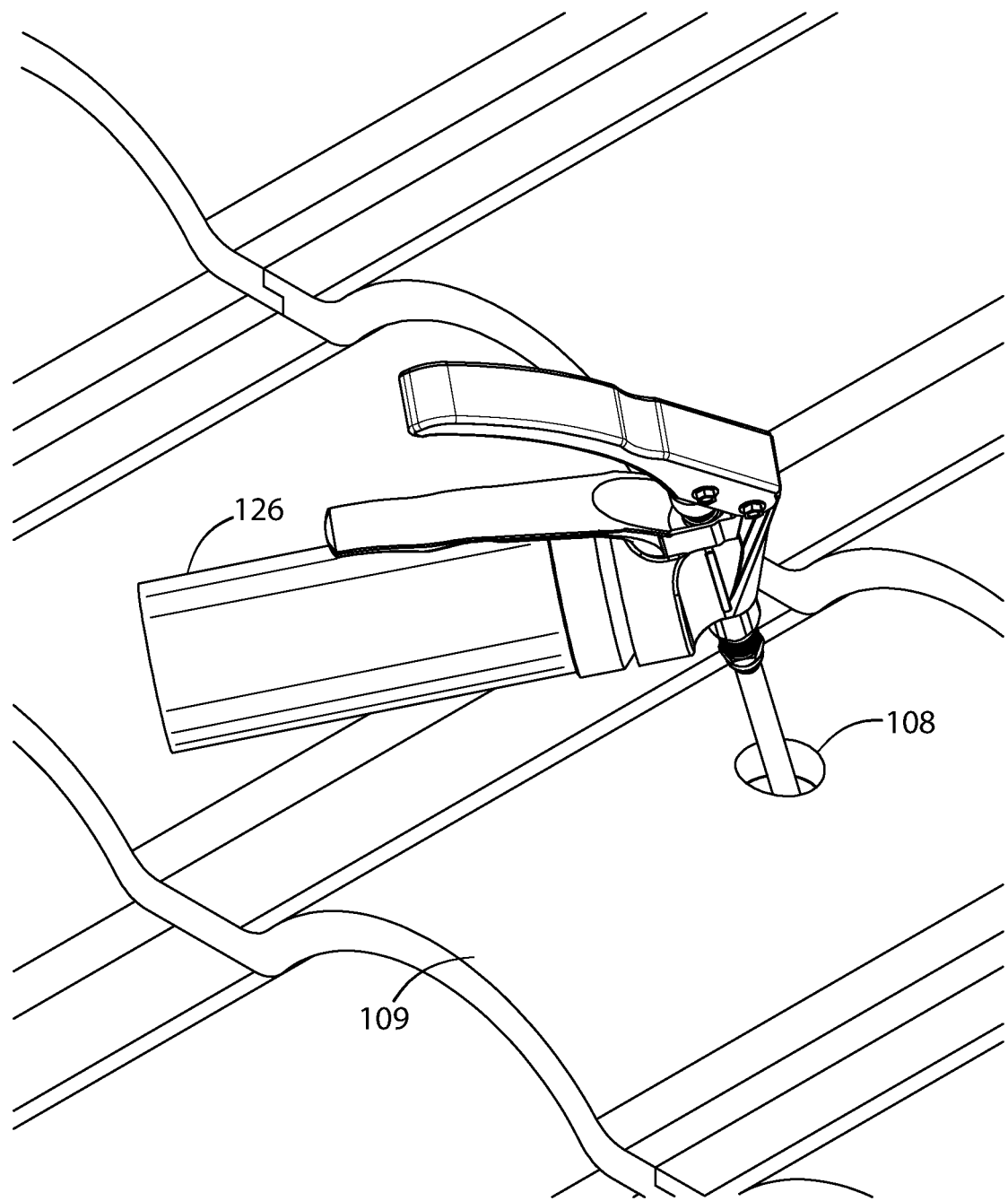
FIG. 12 illustrates the step of applying a layer of polyurethane foam through the hole and over the roof adhesive sealant.

Referring to FIGS. 8 and 12, in step 132, after applying the roof adhesive sealant in step 131, and before the roof adhesive sealant cures, the installer applies a layer of polyurethane foam through the hole 108 and over the waterproof roof adhesive sealant. In FIG. 12, the roof tile 109 hides the layer of polyurethane foam 114 and roof adhesive sealant 115. FIGS. 3 and 3A show the relationship between the roof adhesive sealant 115 and the polyurethane foam 114. As shown in FIGS. 3 and 3A, the installer may optionally fill much of the cavity under the roof tile 109 with the polyurethane foam 114. FIG. 12 illustrates a foam dispenser 126 for applying the polyurethane foam. The installer can alternatively dispense the polyurethane foam 114 (FIG. 3) from a can or using a foam dispensing gun. Typically, the installer may apply a layer of polyurethane foam 114 wide enough to cover the stanchion and where the three or more threaded roof fasteners enter the underlayment 116, and covers the roof adhesive sealant. FIG. 3 illustrates the three or more threaded roof fasteners as threaded roof fasteners 110, 111, 112.

Figure 13:
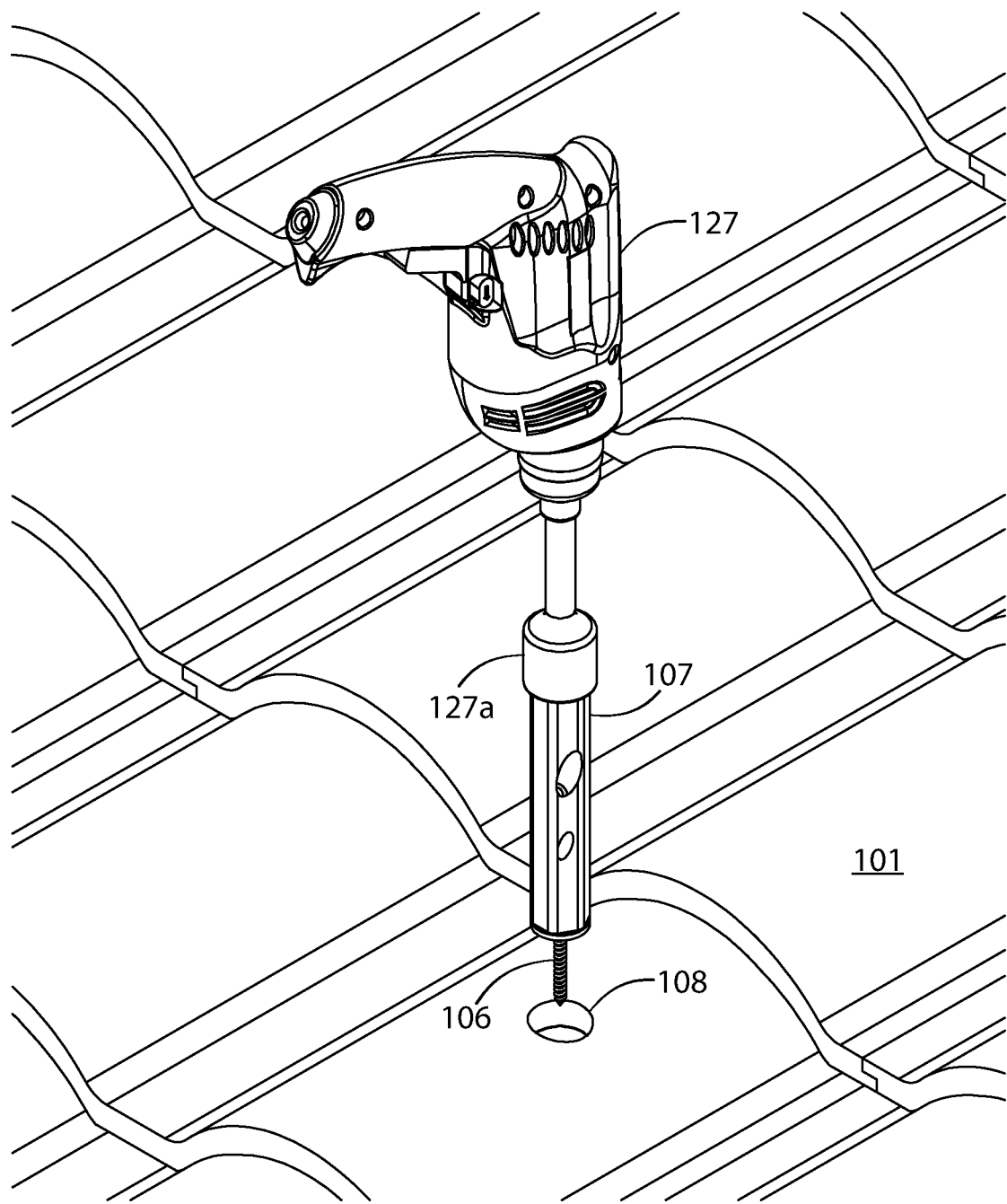
FIG. 13 illustrates the step of passing the stanchion into the hole and securing it to the roof deck.

Referring to FIG. 8 and FIG. 13, in step 133, with the double-ended threaded fastener 106 secured to the bottom of the stanchion 107, and the polyurethane foam not fully expanded and cured, the installer secures the stanchion 107 to the roof deck of the tile roof 101 through the hole 108 and over the polyurethane foam and roof adhesive sealant. FIG. 3, shows the stanchion 107 secured to roof deck 102 over the polyurethane foam 114 and roof adhesive sealant 115, and roof underlayment 116 by the double-ended threaded fastener 106. In FIG. 13, using a hand tool or power tool, such as power tool 127, the installer screws the double-ended threaded fastener 106 into the polyurethane foam 114, roof adhesive sealant 115, and roof underlayment 116 from FIG. 3. To increase adhesion of the double-ended threaded fastener 106 and the stanchion 107 and allow the polyurethane foam 114 to compress under the stanchion 107, the installer may secure the stanchion 107 before the polyurethane foam 114 and roof adhesive sealant 115 cures. FIG. 13 illustrates the stanchion 107 as hexagonally shaped. This allows the installer to use a hexagonal socket, such as hexagonal socket 127a, to drive the stanchion 107 into the roof deck 102 of FIG. 3.

Figure 14:
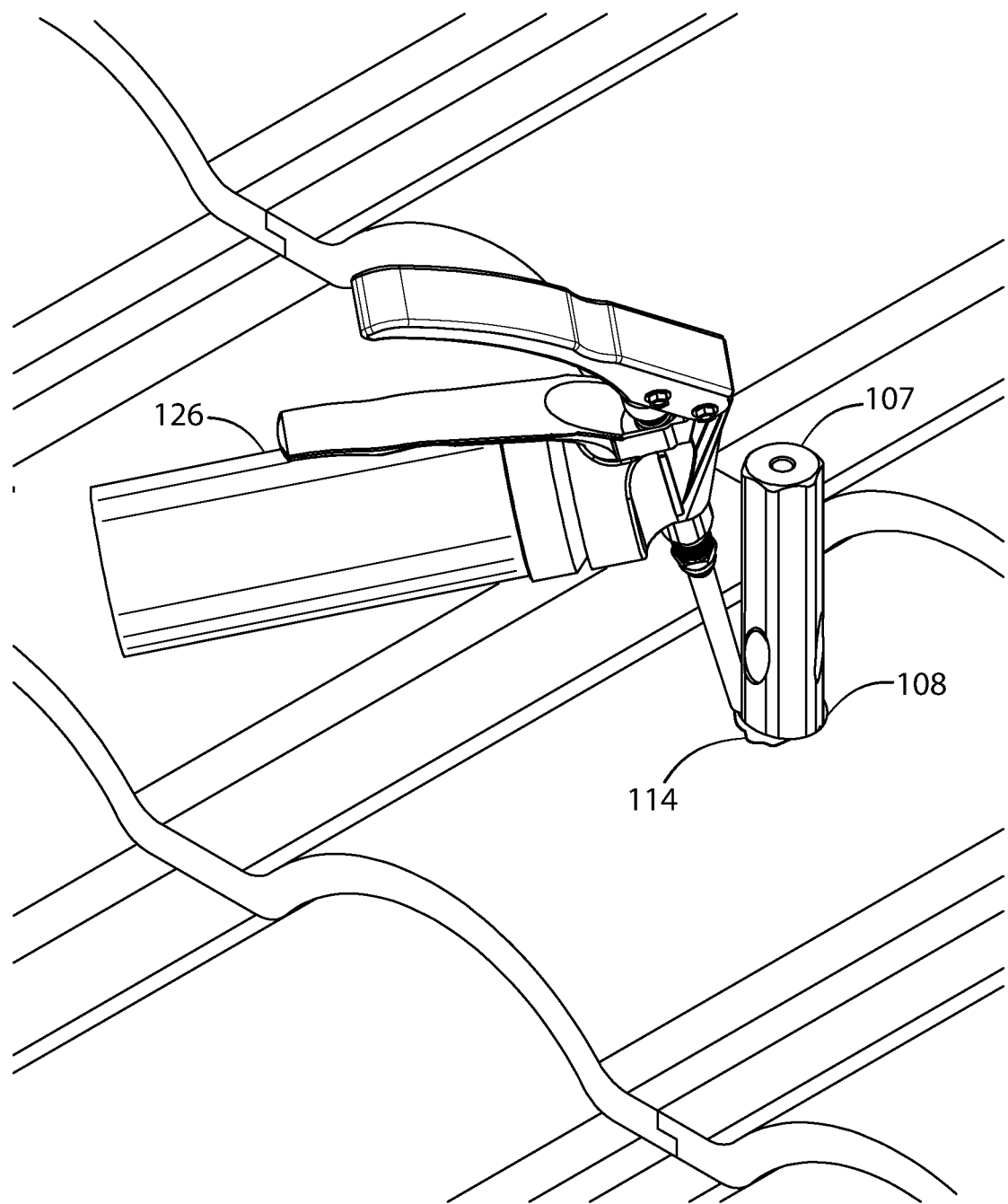
FIG. 14 illustrates the step of applying additional polyurethane foam between the gap in between the edge of the hole and the stanchion.

Referring to FIGS. 8 and 14, in step 134, the installer may apply polyurethane foam 114 between the hole 108 and the stanchion 107 to fill in any remaining gaps where water may leak in. Alternatively, the installer may opt to apply roof adhesive sealant instead of, or in addition to, the polyurethane foam 114. FIG. 14 illustrates the polyurethane foam 114 applied using a foam dispenser 126. As discussed in FIG. 12, the installer can alternatively dispense the polyurethane foam 114 from a can or using a foam dispensing gun.

Figure 15:
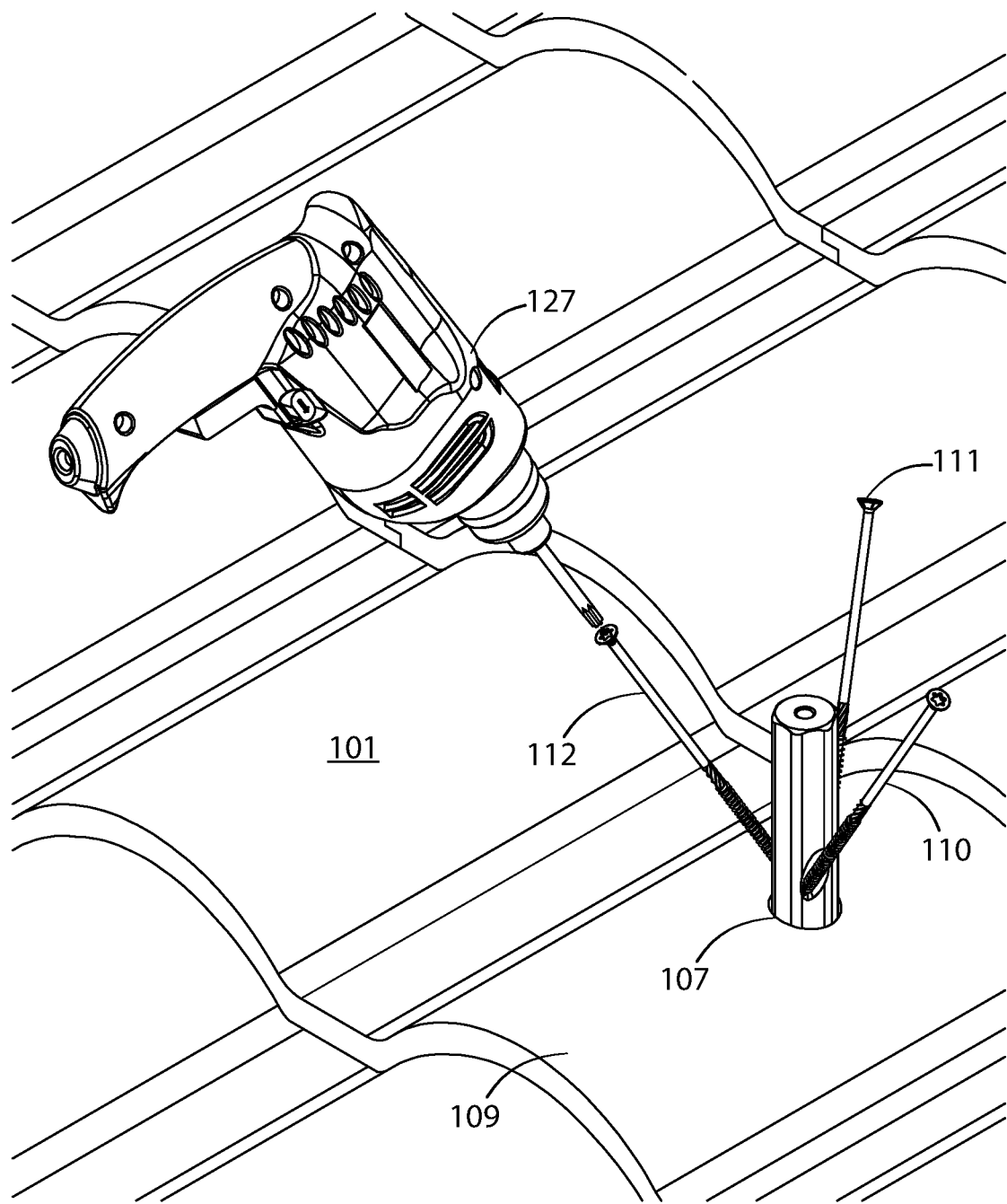
FIG. 15 illustrates the step of extending threaded roof fasteners into oblique apertures in the stanchion, through the polyurethane foam, and roof adhesive sealant, and into the roof deck.

Referring to FIGS. 8 and 15, in step 135, using a hand tool or power tool, such as power tool 127, the installer seats the threaded roof fasteners 110, 111, 112 into the oblique apertures in the stanchion 107. They seat the threaded roof fasteners 110, 111, 112 through the foam and sealant and into the roof deck. They do this without removing the roof tile 109 and any roof tile on the tile roof 101. FIG. 3 illustrates the relationship between the threaded roof fasteners 110, 111, 112, the polyurethane foam 114, and the roof adhesive sealant 115. To increase adhesion of the threaded roof fasteners 110, 111, 112, the installer may seat the threaded roof fasteners before the polyurethane foam 114 and the roof adhesive sealant 115 cures. Referring to FIG. 8, an installer may optional reverse the order of step 134 and step 135.

Figure 16:
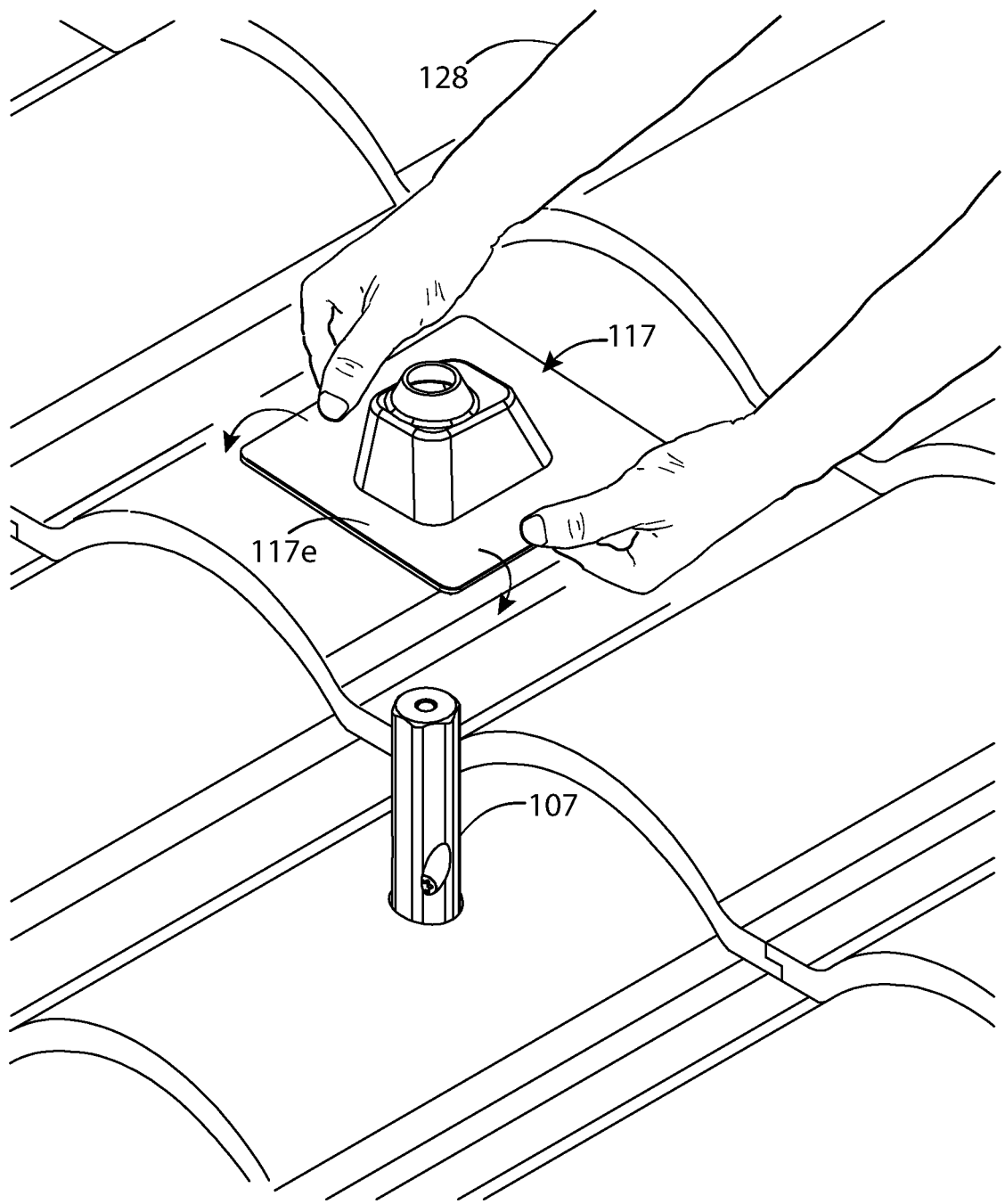
FIGS. 16 and 17 illustrate the step of forming the roof-flashing and securing it over the stanchion to the tile roof.

In FIGS. 8 and 16, in step 136, the installer 128 forms the metal flashing 117e of the roof-flashing 117. In FIGS. 8 and 17, in step 136, the installer places the roof-flashing 117 over the stanchion 107 and secures it to the roof tile 109 of the tile roof 101. Referring to FIGS. 9 and 16, in step 136a the installer 128 forms the roof-flashing to match the roof contour. Referring to FIGS. 9 and 17, as discussed, the roof-flashing 117 may include a butyl rubber pad 119 or other elastomeric material adhered to the bottom surface of the roof-flashing 117. Optionally, the butyl rubber pad 119 may be a peel-and-stick butyl rubber pad. In that case, in step 136b, the installer removes the protective paper 119a from the peel-and-stick pad before positioning the roof-flashing 117 over the stanchion 107 in step 136c, and pressing the formed flashing and butyl rubber sheet against the roof tile 109 in step 136d. Instead of a butyl rubber pad 119, the installer could use other elastomeric material, such as EPDM, in combination with a roof adhesive. The installer may also directly apply the flashing to the roof tile using a butyl rubber caulk, butyl rubber liquid, or other roof adhesive sealant capable of creating a waterproof adhesive bond between metal flashing and roof tile.

FIG. 18 illustrates the tile roof mounting assembly 105 attached to the tile roof 101 resulting from the assembly sequence in FIGS. 8,9, and 10-17. The roof-flashing 117 is secured to the tile roof 101. The stanchion 107 extends from the mouth 117d of the integrated elastomeric boot 117c. The assembly sequence did not require removal of roof tiles or alteration to roof tiles except for drilling the hole 108 in step 130.

Figure 19:
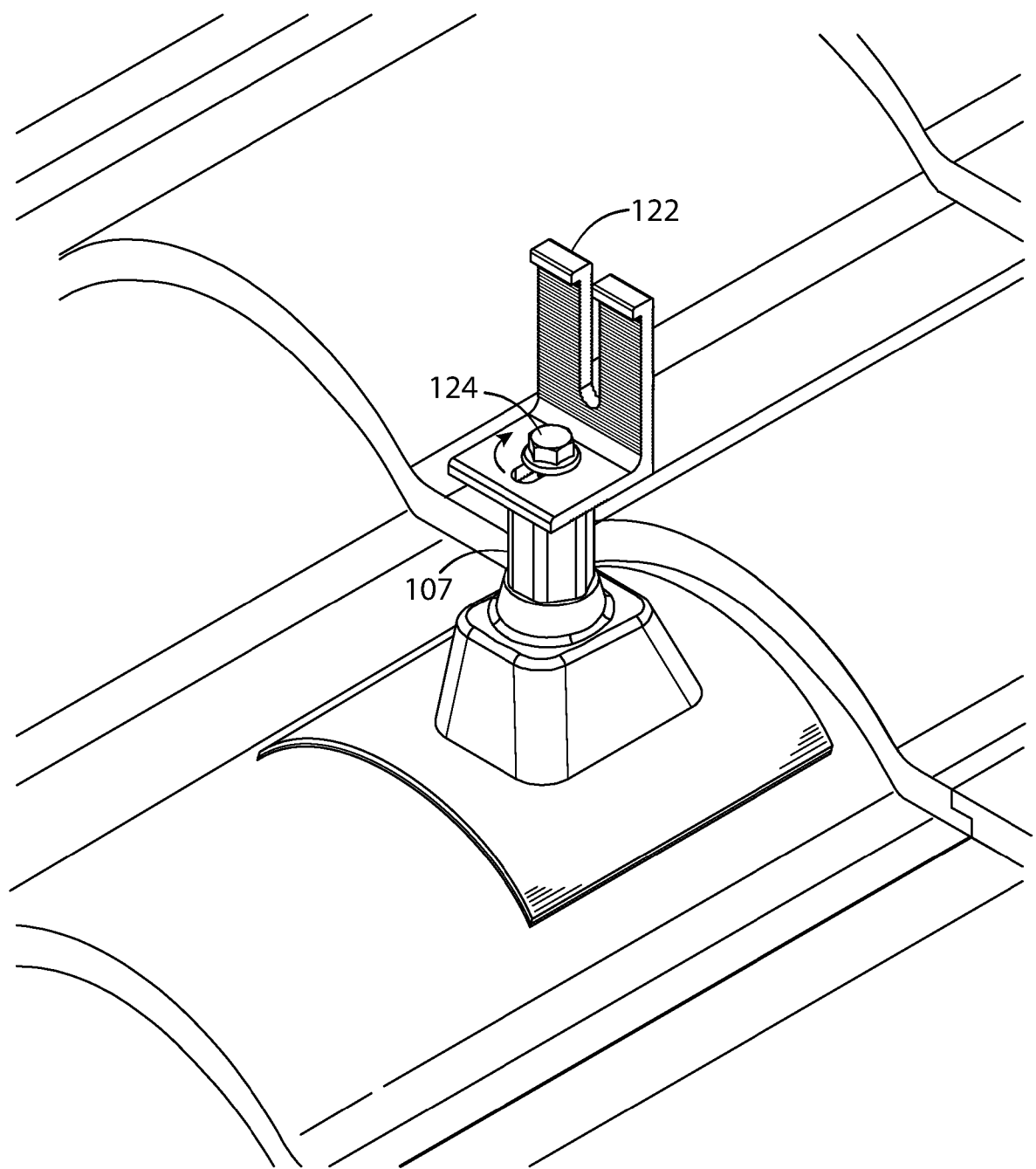
FIGS. 19 and 20 illustrate the steps of attaching portions of the solar panel racking system to the tile roof mounting assembly.
Figure 20:
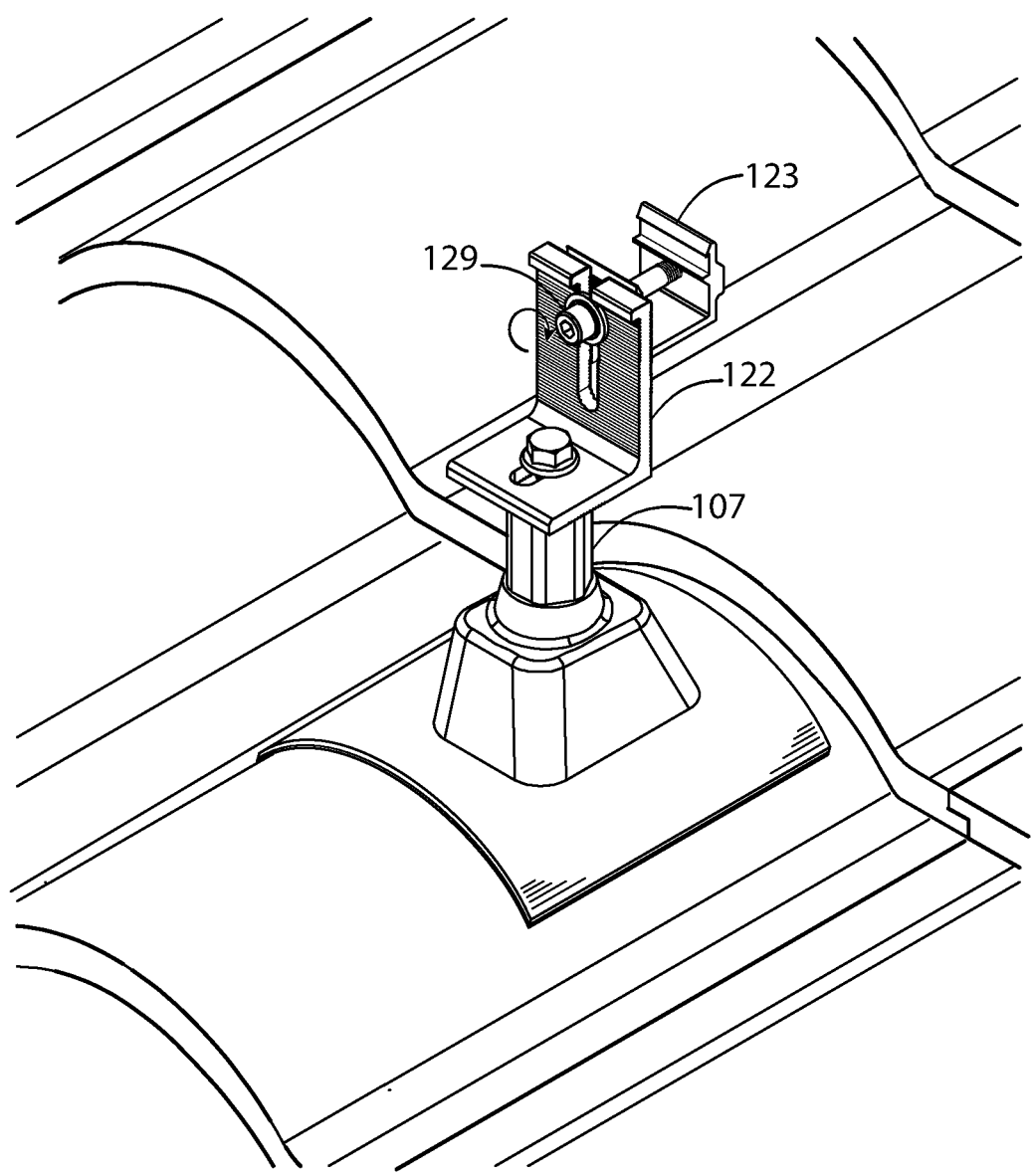

With tile roof mounting assembly 105 installed on the tile roof 101, the installer can now install the remainder of the solar panel racking system. As previously described, this can be a rail-less system or a rail-based system, for example the rail-based system described in FIGS. 1-3. As an example, FIGS. 19 and 20 illustrate attaching portions of the solar panel racking system 104 from FIGS. 1-3 to the stanchion 107 of FIGS. 19 and 20. In FIG. 19, the installer may install the L-foot 122 to the stanchion 107 using the threaded fastener 124. In FIG. 20, the installer may then install the L-foot adapter 123 to the L-foot 122 using threaded fastener 129. Note that the installer may opt to pre-install the L-foot adapter 123 to the L-foot 122. FIG. 1 illustrates the completed assembly. Referring to FIG. 1, to complete the sequence, the installer would snap the rail into the L-foot adapter 123, seat the solar panel 103 on the rail 120, and clamp down the solar panel clamp 121 to the solar panel 103 and the rail 120.

Conclusion and Variations.

The Summary, Detailed Description, and figures describe examples of a tile roof mounting assembly and a method for securing the tile roof mounting assembly to a tile roof without removal of roof tiles from the tile roof. This disclosure provides examples of devices, components, and configurations to help the reader understand the described general principles. The following are examples of variations and combinations of different components, structures, and features that still adhere to the general principles.

FIGS. 1-3 illustrated the tile roof mounting assembly 105 attached to a rail-based racking system. An installer can attach the tile roof mounting assembly 105 to other rail-based systems as well as rail-less systems. For example, using the L-foot 122 without an L-foot adapter 123, an installer could attach tile roof mounting assembly 105 into the sides of rails with lengthwise slots. An installer may also install the tile roof mounting assembly 105 in a rail-less system that uses an L-foot as the base of the system. For example, an installer may use tile roof mounting assembly 105 with the Applicant's rail-less system described in U.S. patent application Ser. No. 18/122,044 that will issue as U.S. Pat. No. 11,757,400 on Sep. 12, 2023.

The discussion for FIG. 13 described the stanchion 107 as hexagonal and driven by a hexagonal socket 127a. While hexagonal sockets are common, the upper portion, or "tool-receiving portion," of the stanchion 107 can be any shape to accommodate a specific socket type. For example, the tool-receiving portion of the stanchion 107 can be square to receive a square socket or triangular to receive a triangular socket. The main body of the stanchion 107 can be cylindrical or any other shape to accommodate the apertures 107a, 107b, 107c of FIG. 7 that extend obliquely through the stanchion 107.

FIGS. 10, 13, and 15 illustrate the power tool 127 as a drill. In FIG. 10, the power tool 127 can be a corded drill, cordless drill, or any other power or hand tool capable of drilling a hole in ceramic, porcelain, cement, or clay roof tile. The power tool 127 of FIG. 13 can be a corded or cordless drill or impact driver or other power tool suitable for turning the stanchion 107 with enough force to screw the double-ended threaded fastener 106 into the roof deck. Alternatively, an installer could us a hand tool such as a socket wrench, adjustable wrench, open end wrench, combination wrench, racket wrench, or other hand tool suitable for turning the stanchion 107 with enough force to screw the double-ended threaded fastener 106 into the roof deck. The power tool of FIG. 15 could be a corded or cordless drill or impact driver or other power tool or hand tool suitable for screwing the threaded roof fasteners 110, 111, 112 into the roof deck.

FIG. 3 and others illustrate three threaded fasteners extending obliquely through the stanchion 107, the threaded roof fasteners 110, 111, 112. In general, three or more threaded fasteners extending obliquely through the stanchion 107 provide a stable base. These three or more threaded roof fasteners are typically wood screws, deck screws, or other screws capable of securely fastening the stanchion 107 to the roof deck 102. FIG. 15 illustrates the threaded roof fasteners 110, 111, 112 with Torx heads. The installer may choose any fastener head type suitable for the hand tool or power tool they are using. Examples of fastener heads that may be suitable include Torx, slotted, Philips, Frearson, Robertson (square), or hex. FIG. 19 shows threaded fastener 124 as a hex bolt. FIG. 20 shows threaded fastener 129 as a cap head hex screw. Both include machine-threaded bodies. The installer may substitute other types of fastener heads with machine-threaded bodies to accommodate their power or hand tools.

The variations described, the general principles taught, and undescribed variations, devices, and systems that encompass the general principles described in this disclosure, are within the claim's scope.

The invention claimed is:

1. A method for securing a solar panel racking system to a tile roof, comprising:
   drilling a hole in a roof tile secured to the tile roof;
   applying a roof adhesive sealant through the hole and onto a roof underlayment that is positioned below the hole and over a roof deck;
   applying polyurethane foam through the hole and on top of the roof adhesive sealant;
   seating at least a portion of a stanchion through the hole and into the polyurethane foam before the polyurethane foam cures and over the roof adhesive sealant; and
   the applying the roof adhesive sealant, the applying the polyurethane foam, and the seating the stanchion are performed without removing the roof tile.

2. The method of claim 1, wherein:
   securing the stanchion to the roof deck by extending a threaded roof fastener from the stanchion through the polyurethane foam, through the roof adhesive sealant, and into the roof deck.

3. The method of claim 1, wherein:
   securing the stanchion to the roof deck by extending a double-ended threaded fastener extending from under the stanchion and three or more threaded roof fasteners obliquely through the stanchion, through the polyurethane foam, through the roof adhesive sealant, and into the roof deck.

4. The method of claim 1, further comprising:
   forming a roof-flashing to a shape of the roof tile; and
   positioning the roof-flashing over the stanchion and the roof tile after the securing the stanchion to the tile roof.

5. The method of claim 1, further comprising:
   forming a roof-flashing with an integrated elastomeric boot, to a shape of the roof tile; and
   positioning the roof-flashing over the stanchion and the roof tile after the securing the stanchion to the tile roof.

6. The method of claim 1, further comprising:
   positioning a roof-flashing over the stanchion after the securing the stanchion to the tile roof; and
   securing the roof-flashing to the roof tile by a sheet of butyl rubber secured to an underside of the roof-flashing.

7. The method of claim 1, further comprising:
   positioning a roof-flashing over the stanchion after securing the stanchion to the tile roof;
   peeling away paper from a peel-and-stick butyl sheet secured to an underside of the roof-flashing; and
   securing the roof-flashing to the roof tile by the peel-and-stick butyl sheet.

8. The method of claim 1 wherein:
   the applying the polyurethane foam is performed before the roof adhesive sealant fully cures.

9. The method of claim 1, wherein:
   securing the stanchion to the roof deck by extending a threaded roof fastener through the polyurethane foam, through the roof adhesive sealant, and into the roof deck before the polyurethane foam and the roof adhesive sealant fully cure.

10. The method of claim 1, wherein:
    securing the stanchion to the roof deck by extending three or more threaded roof fasteners obliquely through the stanchion, through the polyurethane foam, through the roof adhesive sealant, and into the roof deck before the polyurethane foam and the roof adhesive sealant fully cure.

11. The method of claim 1, wherein:
    securing the stanchion to the roof deck by extending a double-ended threaded fastener extending from under the stanchion and three or more threaded roof fasteners obliquely through the stanchion, through the polyurethane foam, through the roof adhesive sealant, and into the roof deck before the polyurethane foam and the roof adhesive sealant fully cure.

12. A system for securing a solar panel to a tile roof, comprising:
    the tile roof, the tile roof including a plurality of roof tiles secured to the tile roof, roof deck positioned under the tile roof, a roof underlayment secured to the roof deck;
    a roof tile of the plurality of roof tiles, the roof tile includes a hole extending through the roof tile;
    a roof adhesive sealant applied through the hole and positioned under the hole and secured to the roof underlayment;

a polyurethane foam applied through the hole and positioned under the hole and on top of the roof adhesive sealant;

a stanchion, including a stanchion bottom;

at least a portion of the stanchion positioned through the hole, over the roof adhesive sealant, and seated into the polyurethane foam, and the polyurethane foam cured under the stanchion bottom;

a double-ended threaded fastener secured to and extending from under the stanchion into the polyurethane foam, the roof adhesive sealant, the roof underlayment, and the roof deck; and a three or more threaded roof fasteners extend obliquely through and away from the stanchion, and into the polyurethane foam, the roof adhesive sealant, the roof underlayment, and the roof deck.

13. The system of claim 12, further comprising:

a roof-flashing with an integrated elastomeric boot formed to a shape of the roof tile and positioned over the stanchion and the roof tile.

14. The system of claim 13, further comprising:

a peel-and-stick butyl sheet secured to an underside of the roof-flashing and secured the roof tile.

15. The system of claim 12, wherein:

the three or more threaded roof fasteners and the double-ended threaded fastener extend into the roof adhesive sealant and the polyurethane foam while the roof adhesive sealant and the polyurethane foam are curing and remain after curing.

* * * * *